(12) United States Patent
Hagenbuch

(10) Patent No.: US 7,326,023 B2
(45) Date of Patent: Feb. 5, 2008

(54) REAR EJECT BODY FOR OFF-HIGHWAY HAULAGE UNITS

(76) Inventor: LeRoy G. Hagenbuch, 502 W. Northgate Rd., Peoria, IL (US) 61614

( * ) Notice: Subject to any disclaimer, the term of this patent is extended or adjusted under 35 U.S.C. 154(b) by 117 days.

(21) Appl. No.: 10/374,803

(22) Filed: Feb. 25, 2003

(65) Prior Publication Data

US 2003/0223849 A1    Dec. 4, 2003

Related U.S. Application Data

(60) Provisional application No. 60/424,169, filed on Nov. 6, 2002, provisional application No. 60/365,328, filed on Mar. 18, 2002, provisional application No. 60/359,359, filed on Feb. 25, 2002.

(51) Int. Cl.
*B60P 3/00* (2006.01)
(52) U.S. Cl. .................... 414/513; 414/517
(58) Field of Classification Search ............. 414/513, 414/517; 37/430, 432
See application file for complete search history.

(56) References Cited

U.S. PATENT DOCUMENTS

| | | | | |
|---|---|---|---|---|
| 2,324,749 | A | * | 7/1943 | Wieden ................ 62/328 |
| 2,565,850 | A | * | 8/1951 | Hyler et al. ............ 37/426 |
| 2,988,832 | A | * | 6/1961 | Hancock et al. ........ 37/422 |
| 3,073,044 | A | * | 1/1963 | Bernotas .............. 37/416 |
| 3,170,578 | A | | 2/1965 | Moreland |
| 3,252,600 | A | | 5/1966 | Brisson et al. |
| 3,256,778 | A | | 6/1966 | Fine |
| 3,465,458 | A | * | 9/1969 | Wagner ............... 37/431 |
| 3,576,161 | A | | 4/1971 | Wright |
| 3,584,403 | A | * | 6/1971 | Copeland ............. 37/201 |
| 3,613,556 | A | | 10/1971 | Wright et al. |
| 3,675,347 | A | | 7/1972 | Stewart et al. |

(Continued)

FOREIGN PATENT DOCUMENTS

| EP | 0 65 249 A1 | 11/1982 |
|---|---|---|
| NL | 7 207 311 A | 6/1974 |

OTHER PUBLICATIONS

Bucher Hydraulics, Valve Block for Compacting Container, Product Data Sheet, undated (available to applicant around Nov. 2002).

(Continued)

*Primary Examiner*—Thomas J. Brahan
(74) *Attorney, Agent, or Firm*—Leydig, Voit & Mayer, Ltd.

(57) ABSTRACT

A rear eject body for a truck is provided. The body includes a floor and a pair of opposing sidewalls. A tailgate extends between the opposing sidewalls at a rear end of the rear eject body. The tailgate is pivotally supported for movement between an open position and a closed position. An ejector is supported in the rear eject body for movement between a retracted position at a forward end of the body and an extended position at the rear end of the body. A tailgate actuation assembly moves the tailgate between the open and closed positions in response to movement of the ejector between the retracted and extended positions. An ejector guide assembly includes sleds that slide in guide tracks to thereby guide the ejector as the ejector moves between the retracted and extended positions.

71 Claims, 43 Drawing Sheets

U.S. PATENT DOCUMENTS

| | | | |
|---|---|---|---|
| 3,682,333 | A | 8/1972 | Krause |
| 3,734,316 | A | 5/1973 | Worthington |
| 3,799,374 | A | 3/1974 | Weaver |
| 3,827,753 | A | 8/1974 | Pitts |
| 3,841,505 | A | 10/1974 | Kent |
| 3,888,366 | A | 6/1975 | Prahst |
| 3,896,947 | A | 7/1975 | Pearce |
| 3,901,394 | A | 8/1975 | Bowles |
| 3,921,839 | A | 11/1975 | Herpich |
| 3,931,687 | A * | 1/1976 | Johns, Jr. ............... 37/431 |
| 4,011,957 | A | 3/1977 | Bendtsen |
| 4,050,594 | A | 9/1977 | Gollnick |
| 4,057,010 | A | 11/1977 | Smith |
| 4,094,424 | A | 6/1978 | Harvey et al. |
| 4,197,049 | A | 4/1980 | Stedman et al. |
| 4,264,261 | A | 4/1981 | Brisson |
| 4,273,497 | A | 6/1981 | Mealing et al. |
| 4,453,879 | A | 6/1984 | Kelley et al. |
| 4,522,551 | A | 6/1985 | Henneberry |
| 4,648,775 | A * | 3/1987 | Verner ............... 414/513 |
| 4,953,109 | A | 8/1990 | Burgis |
| 5,352,084 | A | 10/1994 | Hodgins |
| 5,456,521 | A | 10/1995 | Moyna |
| 5,816,766 | A | 10/1998 | Clark |
| 5,885,049 | A | 3/1999 | McNeilus et al. |
| 6,062,803 | A | 5/2000 | Christenson |
| 6,062,804 | A | 5/2000 | Young et al. |
| 6,079,933 | A | 6/2000 | Moyna et al. |
| 6,092,973 | A | 7/2000 | Burnett et al. |
| 6,102,644 | A | 8/2000 | Young et al. |
| 6,155,776 | A | 12/2000 | Moyna |
| 6,176,673 | B1 | 1/2001 | Moyna et al. |
| 6,238,167 | B1 | 5/2001 | Kenny et al. |
| 6,561,747 | B2 * | 5/2003 | Kenny et al. ............... 414/517 |
| 6,672,822 | B1 | 1/2004 | Moyna |
| 6,719,349 | B2 | 4/2004 | Moyna |
| 6,769,859 | B2 | 8/2004 | Moyna |
| 6,869,250 | B2 | 3/2005 | Moyna |
| 2003/0019642 | A1 | 1/2003 | Moyna |
| 2003/0170101 | A1 | 9/2003 | Moyna |
| 2004/0032141 | A1 | 2/2004 | Moyna |
| 2004/0146356 | A1 | 7/2004 | Moyna |
| 2004/0188115 | A1 | 9/2004 | Moyna et al. |

OTHER PUBLICATIONS

Photos (8) of Reynolds RE-30 Tailer/Rear Ejector Wagon taken during Mar. 1999 ConExpo/ConAgg Show.

Alloy Steel International: Arcoplate Product Brochure, undated (available to applicant prior to Feb. 25, 2002).

International Search Report (Feb. 13, 2004).

Stulz Sickles Steel Company, www.stulzsicklessteel.com, Producers of Manganal Steel Products and Welding Electrodes for Resistance to Wear—Material Safety, pp. 1-5.

Stulz Sickles Steel Company, www.stulzsicklessteel.com, Producers of Manganal Steel Products and Welding Electrodes for Resistance to Wear—Products, pp. 1-18.

Alloy Steel International, www.alloysteel.net, The King of all Wear Resistent Products. pp. 1.

Alloy Steel International, www.alloysteel.net, Technical Edge—Company News, Arcoplate Distribution Agreement, (Feb. 26, 2003), pp. 1.

Alloy Steel International, www.alloysteel.net, Technical Edge—Media Releases, Van de Grijp sets wear-resistant standard, (May 21, 2002), pp. 1.

Alloy Steel International, www.alloysteel.net, Technical Library—Arcoplate Grades, Arcoplate Alloy and Base Thickness, pp. 1-2.

Alloy Steel International, www.alloysteel.net, Technical Library—Wear Graphs, pp. 1.

Printout of the Caterpillar 740 Ejector Articulated Truck website page "Performance and productivity", retrieved from http://cmms.cat.com/cmms/servlet/cat.dcs.cmms.servlet.GetSalesFeaturesFullServlet?dsf F1 on Jul. 11, 2005 (2 pages).

Copy of the Multidrive M8-35 Multi-Load Ejector brochure - *The New Generation ADT*- "Low Operating Costs Maximum Operating Advantages", 23 pages total (2003).

Copy of Multidrive M8-40 High Speed Ejector-Hauler Brochure - *Technical Specification - Multidrive*, 5 pages total (2003).

Information sheet from Sure Alloy Steel Corporation entitles "SA1750-CR Out Performs Its Competition Once Again" (2005) (1 page).

Printout from Sure Alloy News entitles "SA1750-CR Out Performs the Competition Once Again!" retrieved from http://surealloy.com/news_details.asp?aid=20 on Jul. 6, 2005 (2 pages).

Printout entitled "Overlay Products" from the Trimay Wear Plate Ltd. website http://www.trimay.ca/overlay.shtml on Jul. 6, 2005 (3 pages).

Printout entitled "Trimay Wear Resistant Overlay Steel Plate - Range Summary" from the Trimay Wear Plate Ltd. website http://www.tritenapg.com/product4.html on Jul. 6, 2005 (2 pages).

Article taken from Grading and Excavation Contractor/Articulated Dump Trucks entitled *"Articulated Dump Trucks: The Arnold Schwartzenegger of Trucks"* at http://www.forester.net/gx_0207_articulated.html on Dec. 14, 2005 (10 pages).

Article taken from Economic Development: Iowa State University - *Helping Iowa and Lowans become their best*- "*Success Stories - Examples of ISU assistance to business/industry*", http://www.iastate.edu/bus/econdev/success.shtml entitled 'Example of ISU assistance to business/industry o n May 9, 2005 (1 page).

Article entitled "*Welcome to E-Ject System, L.C. - The Leader in World-Class Earthmoving Equipment*", retrieved from http://www.ejectsystems.com on Dec. 14, 2005 (3 pages).

* cited by examiner

FIGURE 40

REAR EJECT BODY FOR OFF-HIGHWAY HAULAGE UNITS

CROSS-REFERENCE TO RELATED APPLICATIONS

This patent application claims the benefit of U.S. Provisional Patent Application 60/359,359, filed Feb. 25, 2002, U.S. Provisional Patent Application 60/365,328, filed Mar. 18, 2002 and U.S. Provisional Patent Application 60/424,169 filed Nov. 6, 2002.

FIELD OF THE INVENTION

This invention pertains to haulage units, in particular off-highway haulage units with open top, top loaded rear eject bodies.

BACKGROUND OF THE INVENTION

Off-highway trucks equipped with rear eject bodies are used to haul and dump materials in haulage applications such as mines, construction sites and landfills. Rear eject bodies have a number of advantages over conventional rear dump bodies. For example, rear eject bodies typically are self-cleaning thereby minimizing carry back of sticky materials. Additionally, this style of body allows dumping on the go, increasing truck productivity. Dumping on the go also minimizes the need for additional support equipment to spread and level the dumped material. With regard to the dumping of materials, rear eject bodies allow materials to be dumped on steeper slopes and in areas where there is soft truck underfoot conditions. Moreover, trucks with rear eject bodies can dump their loads in areas with overhead wires and bridges as well as in tunneling applications.

In contrast to conventional rear dump bodies which are pivoted into a raised position for dumping, rear eject bodies use an ejector blade that is moved horizontally from the front end to the rear end of the truck body by one or more hydraulic cylinders to eject and dump material from the truck body. Since the body does not have to be raised for dumping, rear eject bodies are particularly suited for haulage applications in which there is limited overhead dump clearance (e.g., because of wires, bridges, tunnels, and trees), underground haulage application or haulage application where ground instability makes raising a dump body to the dumping position extremely hazardous. Additionally, rear eject bodies dump materials in a more controlled manner. For example, a rear eject body can dump material while the truck is still moving in order to spread the dumped material over a larger area. Dumping material while the truck is on the go also speeds the dumping process. The use of the ejector blade also enables rear eject bodies to handle hard-to-dump sticky materials such as dirt and clay mixtures which hang-up and often do not flow out of conventional raised rear dump bodies.

In general, rear eject bodies are well known on both off-highway trucks and street legal refuse trucks. Unfortunately, many commercially available rear eject bodies have a number of drawbacks. For example, since typical rear eject bodies have a number of moving parts requiring regular lubrication and maintenance, they can be costly and time-consuming to maintain. Moreover, because large hydraulic cylinders are required to move the ejector blade, rear eject bodies can be quite expensive. Some rear eject bodies also use additional hydraulic cylinders to operate the tailgate, further increasing the cost. Many rear eject bodies also dump material relatively slowly, increasing dump cycle times and lowering productivity.

BRIEF SUMMARY OF THE INVENTION

The present invention provides a rear eject body for a truck. The body includes a floor and a pair of opposing sidewalls. A tailgate extends between the opposing sidewalls at a rear end of the rear eject body and is pivotally supported for movement between an open position and a closed position. An ejector blade is supported in the rear eject body for movement between a retracted position at a forward end of the body and an extended position at the rear end of the body.

According to one embodiment of the invention, a tailgate actuation system moves the tailgate between the open and closed positions in response to movement of the ejector blade between the retracted and extended positions. The tailgate actuation system links the tailgate and the ejector blade when the ejector blade is in the closed position thereby holding the tailgate in the closed position. The tailgate actuation system releases the tailgate from the ejector blade as the ejector blade moves from the retracted position towards the extended or material ejection position such that the tailgate can swing freely into the open position. The tailgate actuation system then reestablishes the link between the tailgate and the ejector blade as the ejector blade moves from the extended position back to the retracted position thereby pulling the tailgate from the open position back into the closed position. The tailgate actuation system can further include a flexible link connected to the tailgate that acts around a drum for pulling the tailgate from the open to the closed position. The drum can have a radius of curvature that varies such that the moment arm on which the flexible link acts with respect to the tailgate is greatest when the tailgate is in a horizontal position and relatively less when the tailgate is in the more vertical open and closed positions.

According to another embodiment of the invention, the rear eject body includes an ejector blade guide assembly. The ejector blade guide assembly includes a plurality of sleds connected to the ejector blade. Each sled is received in one of a pair of guide tracks or slides. Each guide track or slide is arranged on an inside surface of a respective one of the sidewalls, wherein the sleds move in guide tracks or slides and thereby guide the ejector blade as the ejector blade moves between the retracted and extended positions.

According to another embodiment of the invention, the rear eject body can include a hydraulic cylinder for moving the ejector blade between the retracted and extended positions. The hydraulic cylinder is configured to extend and thereby move the ejector blade towards the extended position when hydraulic fluid is supplied to an extend side of the hydraulic cylinder and to retract and thereby move the ejector blade towards the retracted position when hydraulic fluid is supplied to a retract side of the hydraulic cylinder. The rear eject body can further include a hydraulic control system for controlling the flow of hydraulic fluid to and from the extend and retract sides of the hydraulic cylinder. When hydraulic fluid is supplied to the extend side of the hydraulic cylinder, the hydraulic control system can be configured so as to build backpressure into the retract side of the hydraulic cylinder before hydraulic fluid is allowed to flow to the extend side of the hydraulic cylinder to initiate extension of the hydraulic cylinder. The hydraulic control system could also be configured to allow hydraulic fluid flow out of the extend side of hydraulic cylinder through a line connecting the extend side of the hydraulic cylinder directly to a hydraulic fluid tank or reservoir when hydraulic fluid is being supplied to the retract side of the hydraulic cylinder during retraction of the hydraulic cylinder when the pressure in the retract side of the hydraulic cylinder reaches a predetermined value.

According to another embodiment of the present invention, the rear eject body can include a hydraulic cylinder for moving the ejector blade between the retracted and extended positions and a mounting arrangement for connecting the barrel of the hydraulic cylinder to the ejector blade. The mounting arrangement defines a vertical pivot axis about which the ejector blade can pivot slightly relative to the hydraulic cylinder as the ejector blade is extended and retracted. The vertical pivot axis is located at a rearward end of the hydraulic cylinder barrel that is furthest from the rod end of the hydraulic cylinder. The mounting arrangement can further include a trunnion mount that defines a horizontal pivot axis about which the ejector blade and hydraulic cylinder can pivot relative to each other. The horizontal pivot axis is located at a forward end of the hydraulic cylinder barrel nearest the rod end of the cylinder.

According to another embodiment of the present invention, the ejector blade can have a lower face that angles upward away from the floor as the lower face extends toward the front end of the body, an upper face that angles downward toward the floor as the upper face extends toward the front end of the body and a pair of opposing side faces wherein each side face angles inward away from the sidewalls as the side face extends towards the front end of the body.

BRIEF DESCRIPTION OF THE DRAWINGS

FIG. 13 is an enlarged partial side perspective view of a rear eject body according to the present invention having an alternative guide track with a flat section of guide track in front of the inclined section at the forward end of one of the guide tracks which helps retain the ejector blade in the retracted position.

in FIGS. 18-24, the ejector blade is extending or moving to the rear of the rear eject body; while in FIGS. 25-28, the ejector blade is retracting or moving to the front of the rear eject body.

FIG. 40 is a schematic drawing of a hydraulic control system for the hydraulic cylinder of the rear eject body of FIG. 1 with the hydraulic cylinder being extended. The arrows indicate direction of hydraulic fluid flow into and out of hydraulic control system.

DETAILED DESCRIPTION OF THE INVENTION

Figure 1:
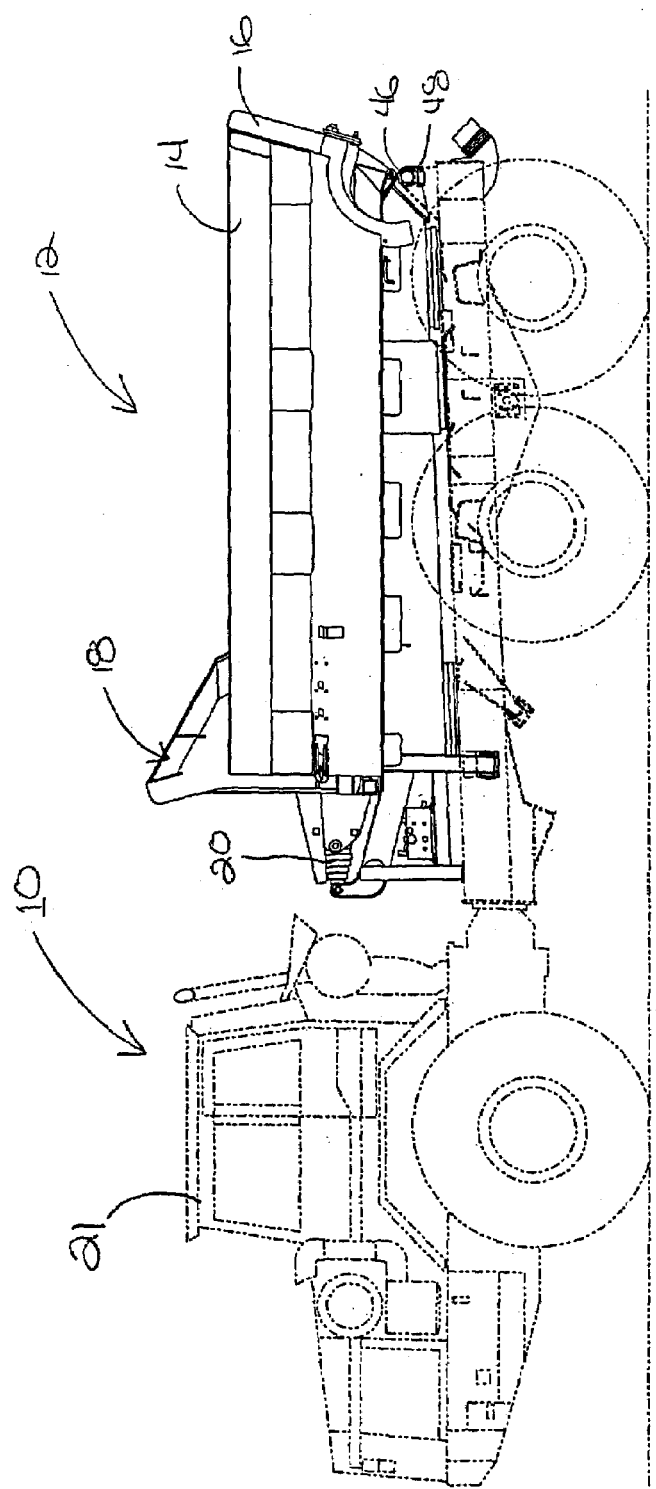
FIG. 1 is a side view of an articulated off-highway truck having an exemplary rear eject body constructed in accordance with the present invention showing the ejector blade retracted and the tailgate closed.

Referring now more particularly to the drawings, there is shown in FIGS. 1-4 an illustrative off-highway truck 10 having a rear eject body 12 constructed in accordance with the teachings of the present invention. The illustrated rear eject body 12 consists of a floor 13, two sidewalls 14, tailgate 16, and an ejector blade 18. The ejector blade 18 when actuated pushes a load in the rear eject body 12 from the front of the rear eject body out the rear of the rear eject body. In particular, the ejector blade 18 is moved from a body loaded or fully retracted position at the front of the rear eject body 12 (see, e.g., FIGS. 1, 2, 5 and 7) to a body empty or fully extended position at the rear of the rear eject body 12 (see FIGS. 3, 4, 6 and 8) by, in this case, a multi-stage double-acting hydraulic cylinder 20. As used herein, the terms "front" and "forward" and "rear" and "rearward" are used with respect to the truck cab 21 being at the front end of the truck 10 and the tailgate 16 being at the rear end of the truck 10 (see FIGS. 1 and 3).

Figure 4:
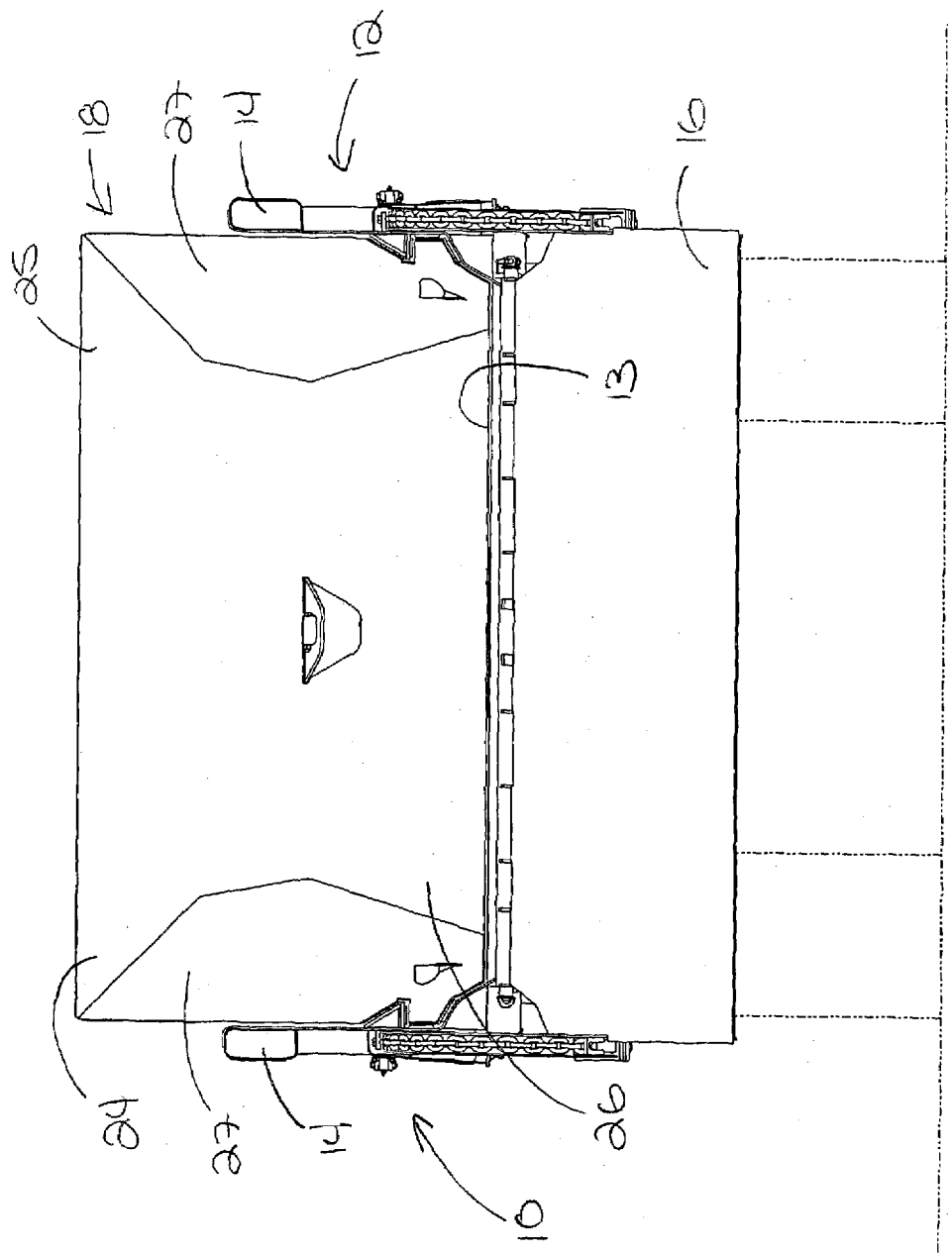
FIG. 4 is a rear view of the truck and rear eject body of FIG. 2 showing the ejector blade extended and the tailgate open.
Figure 5:
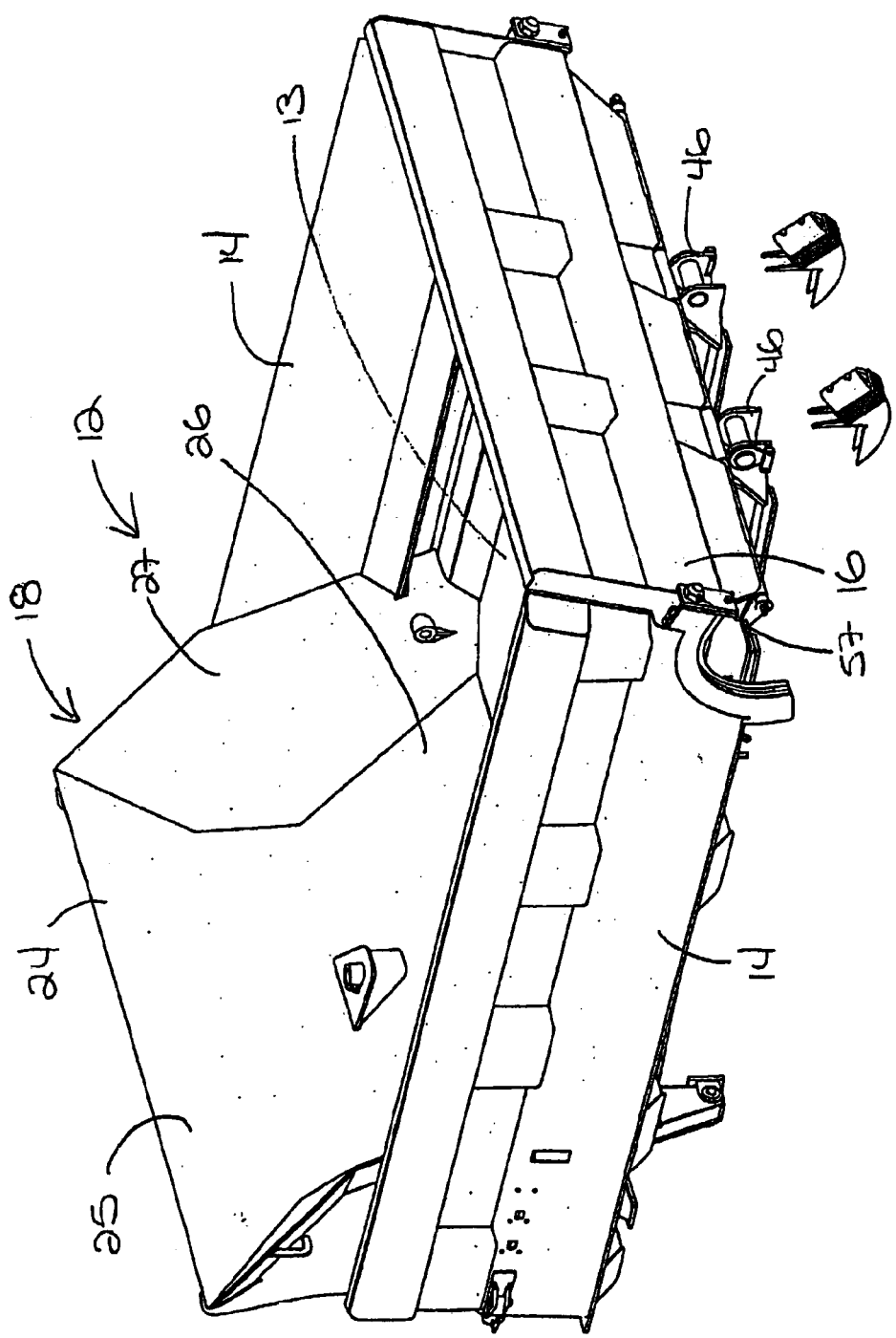
FIG. 5 is a perspective view of the rear eject body of FIG. 1 showing the ejector blade retracted and the tailgate closed.
Figure 6:
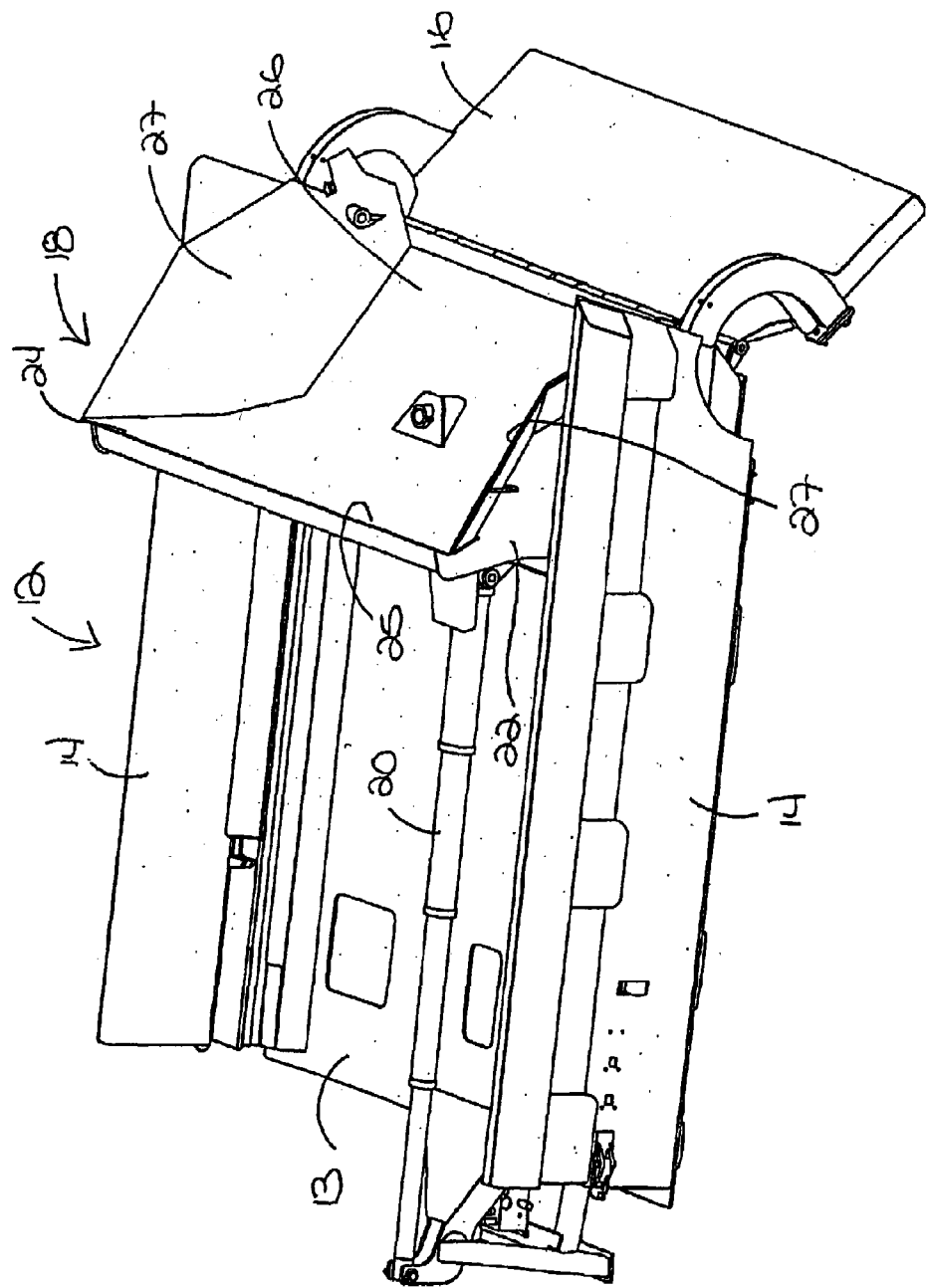
FIG. 6 is a perspective view of the rear eject body of FIG. 1 showing the ejector blade extended and the tailgate open.

In the illustrated embodiment, the ejector blade 18 generally includes a frame 22 (see FIGS. 6-8) that supports an ejector plate 24. As shown in FIGS. 4-6, the ejector plate 24 is oriented so as to face towards the rear end of the rear eject body 12 and extends between the sidewalls 14 of the rear eject body 12 and upwards from the floor 13 of the rear eject body 12 to a distance above the upper edges of the sidewalls 14. The illustrated ejector plate 24 includes an upper face 25, a lower face 26 and a pair of opposing side faces 27. To pull material away from the sidewalls 14 and direct it towards the center of the rear eject body 12, each of the side faces 27 of the ejector plate 24 angles inward towards the center of the body 12 as it extends forward toward the front end of the rear eject body 12. The lower face 26 of the ejector plate 24 angles upward away from the body floor 13 as it extends forward toward the front end of the rear eject body 12 to help lift material up and somewhat off the body floor 13. The upper face 25 of the ejector blade 24, in turn, angles downward towards the body floor 13 as it extends forward toward the front end of the rear eject body 12. This configuration helps prevent material from tumbling over the top of the ejector plate 24 when it is pushing material rearward.

Figure 9:
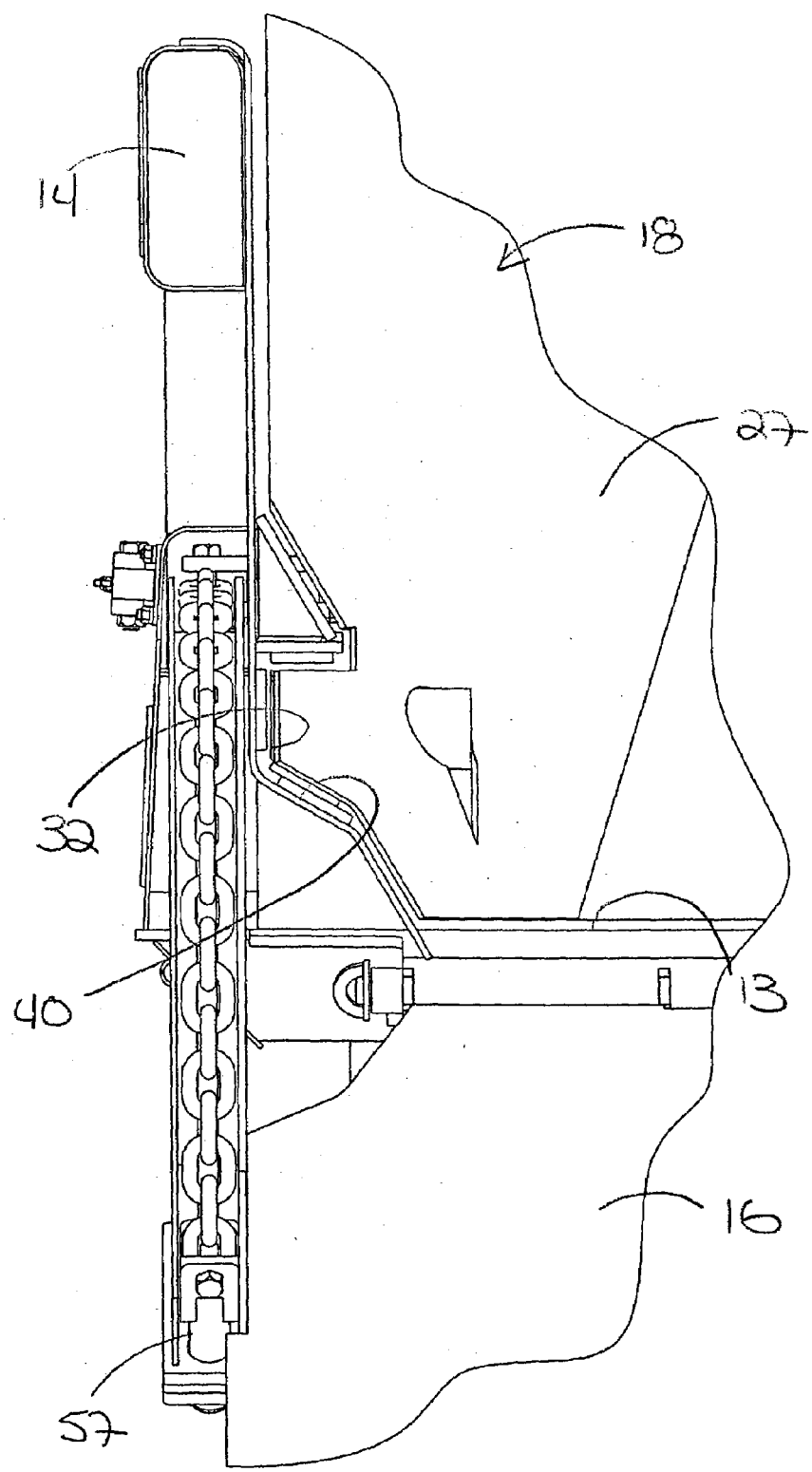
FIG. 9 is an enlarged partial end view of the rear eject body of FIG. 1 showing one of the ejector guide tracks/slides.
Figure 10:
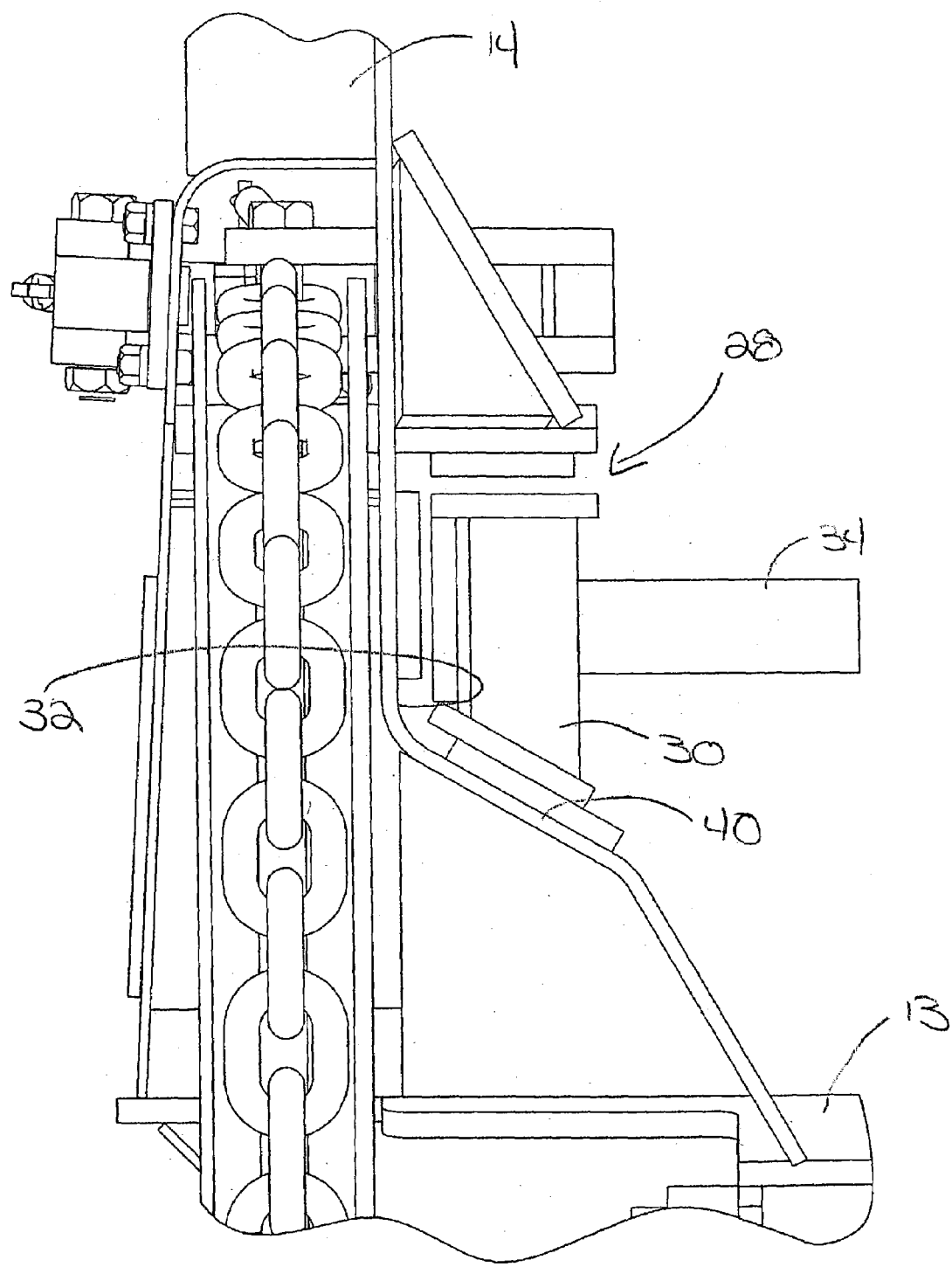
FIG. 10 is an enlarged partial end view of the rear eject body of FIG. 1 showing one of the ejector guide tracks and one of the ejector blade sleds with the ejector blade cutaway.

To guide the ejector blade 18 as it moves between the body loaded or fully retracted position at the front of the rear eject body 12 and the body empty or fully extended position at the rear of the rear eject body 12, the ejector blade 18 includes a guide assembly 28 (see FIG. 10). Typically, conventional ejector blades ride on rollers or cam followers as they move between the front and rear of the truck body. Unfortunately, these rollers and cam followers require regular maintenance and lubrication. In contrast, with one embodiment of the present invention, the guide assembly 28 for the ejector blade 18 can include sleds 30 (see, e.g., FIGS. 7, 10 and 15) that are received and slide in corresponding guide tracks 32 (see, e.g., FIGS. 7-10) arranged along the sidewalls 14 of the rear eject body 12. Unlike conventional rollers and cam followers, the sleds 30 and guide tracks 32 do not have any lubrication points, thereby substantially reducing the required maintenance for the ejector blade 18.

Figure 7:
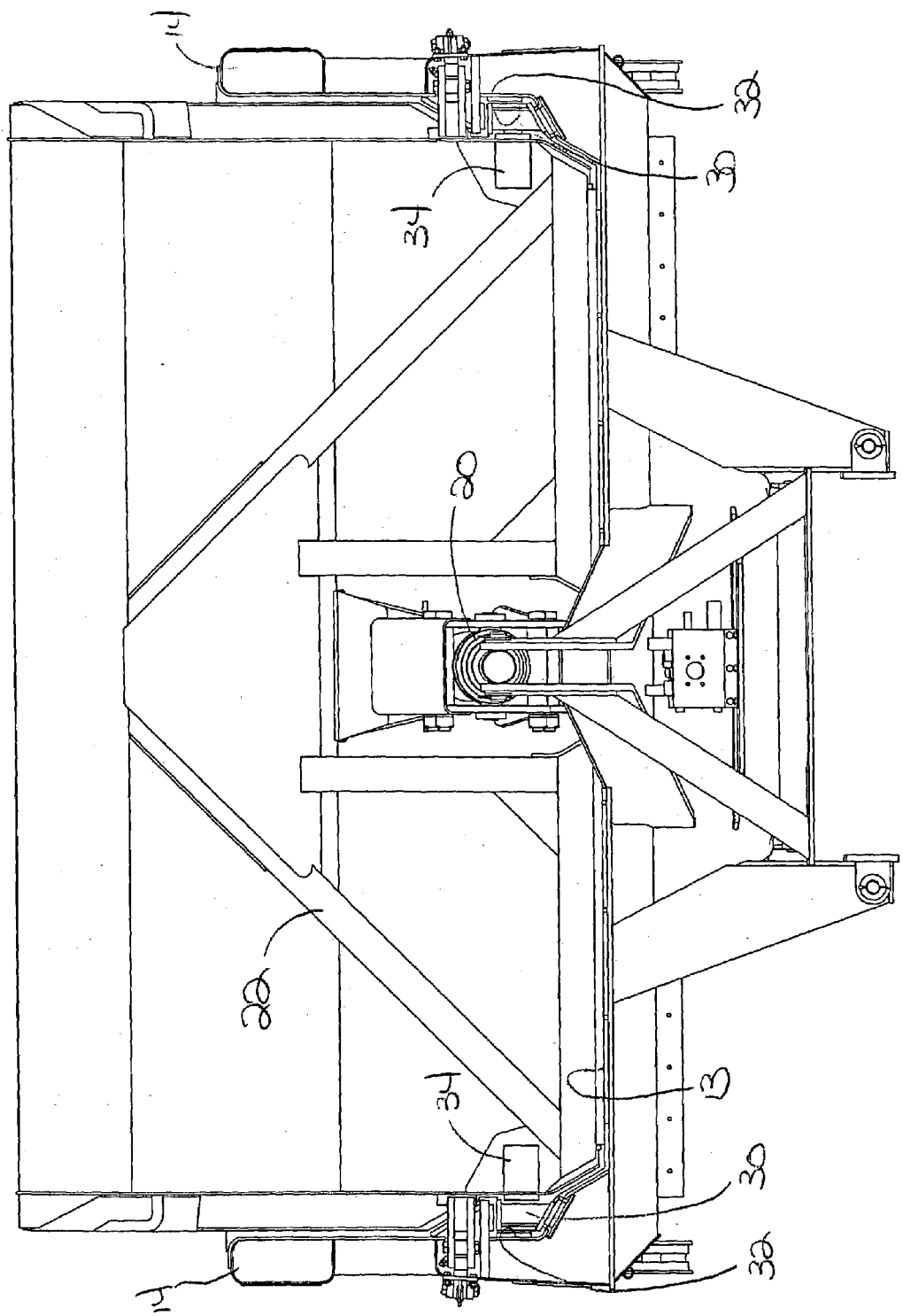
FIG. 7 is a front view of the rear eject body of FIG. 1.
Figure 8:
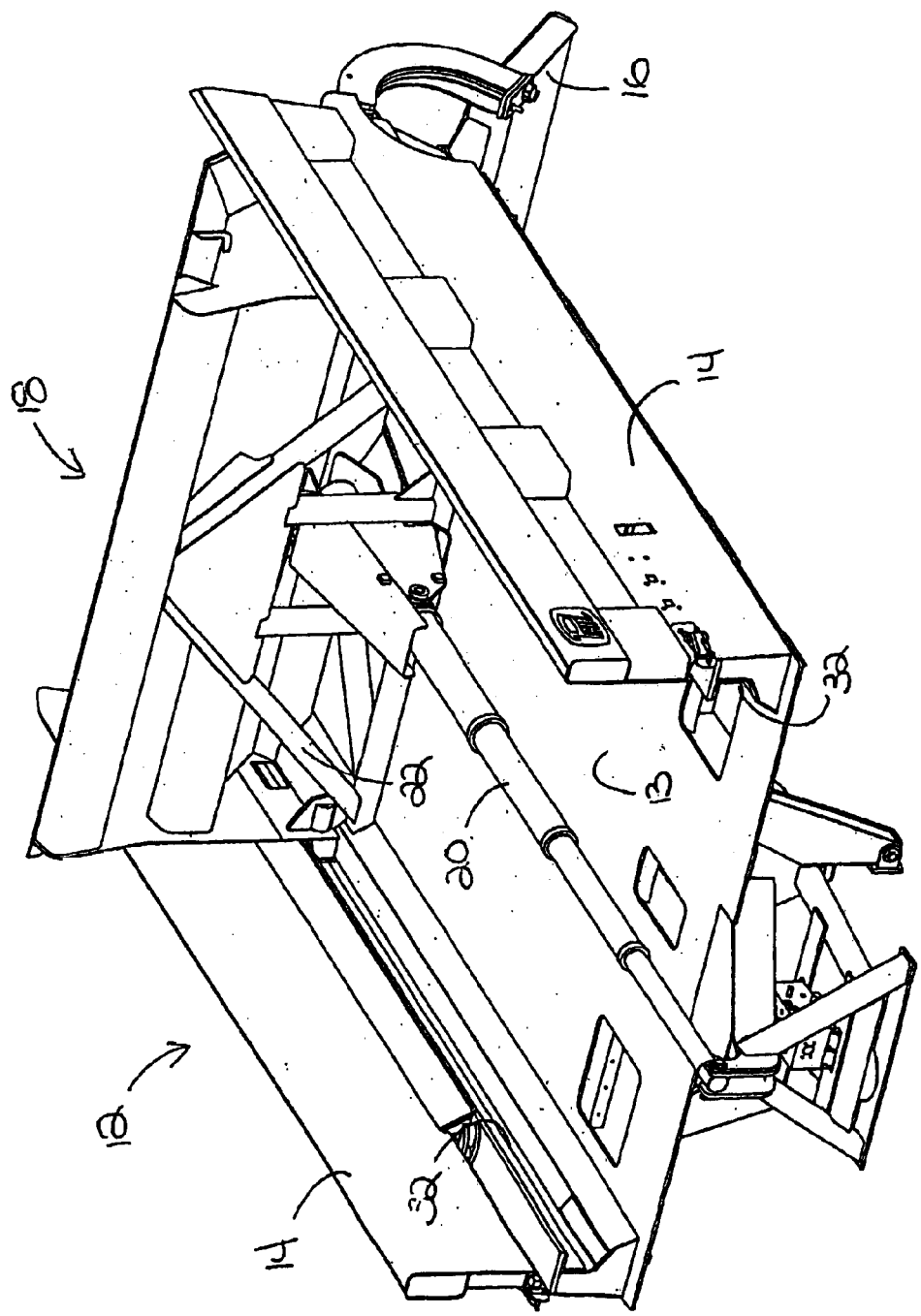
FIG. 8 is a front perspective view of the rear eject body of FIG. 1 showing the ejector blade extended and the tailgate open.

One guide track 32 is arranged along the inner side of each of the two sidewalls 14 of the rear eject body 12 (one of the tracks can be seen in FIGS. 9 and 10 and both can be seen in FIG. 7). In the illustrated embodiment, the ejector blade 18 has two sleds 30 on each side of the ejector blade frame 22 with one side being shown in FIG. 15. These sleds 30 are positioned near the four bottom corners of the ejector blade 18. Each sled 30 is supported on the end of a respective threaded rod 34 (FIGS. 10-11) that is received in a corresponding threaded tube on the ejector blade 18. The use of the threaded rods 34 allows the position of the sleds 30 to be adjusted relative to the ejector blade 18 thereby ensuring a good fit.

To facilitate sliding of the sleds 30 in the guide tracks 32, the sleds 30 can be made of or plated with a hardened steel material. Additionally, the guide tracks 32 in which the sleds 30 ride can also be lined or made out of a very hard steel material such as the same material used for the sleds 30. In particular, the three sides of the guide track 32 (i.e., outside, upper and lower walls of the track—see FIG. 10) can be either lined or made of a very hard steel material. Two examples of steel materials that are suitable for use in constructing the sleds 30 and guide tracks 32 are Hadfield manganese steel, which is a 11-14% manganese steel, and the fused alloy steel plate sold under the tradename Arcoplate by Alloy Steel International, Inc. of 42 Mercantile Way P.O. Box 3087 Malaga DC 6945, Western Australia. Arcoplate wear plate consists of a chromium carbide rich (+/− 60%) steel alloy overlay on a mild steel backing. Additional information regarding the Arcoplate material can be found at www.arcoplate.com.au. One example of a suitable Hadfield manganese steel is the wear-resistant high manganese steel sold under the tradename Manganal by Stulz Sickles Steel Company of Elizabeth, N.J. Manganal is a high manganese austenitic, work hardening steel that typically is 12-14% manganese and 1.00-1.25% carbon. Additional information regarding the Manganal material can be found at www-.stulzsicklessteel.com. The Hatfield manganese and Arcoplate materials are very hard such that each can operate against itself without galling.

Figure 15:
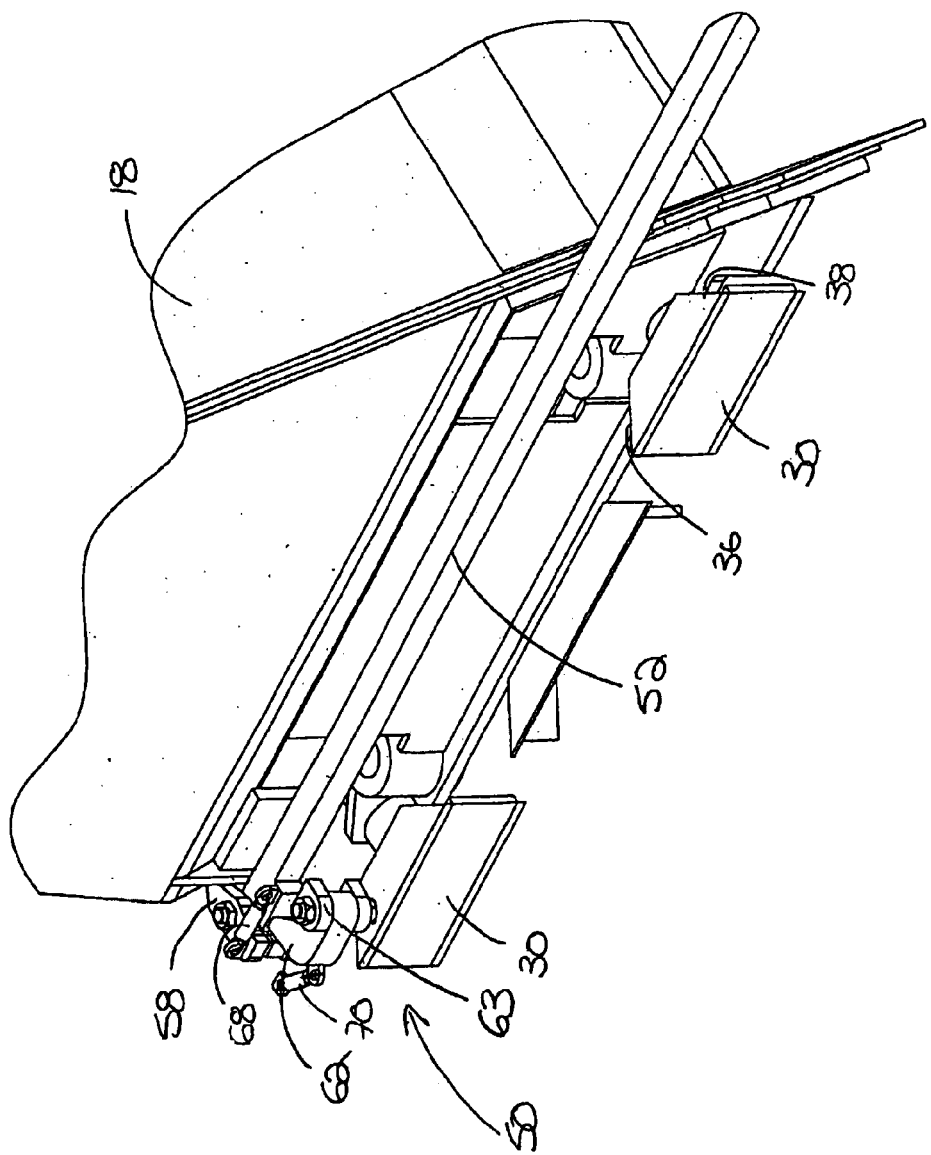
FIG. 15 is an enlarged perspective view of the ejector blade and tailgate actuation system of the rear eject body of FIG. 1 showing the ejector blade in the fully retracted position.

To help ensure that the guide tracks 32 remain clear of debris, the sleds 30 and guide tracks 32 can be configured such that as the sleds 30 move between the front and rear of the rear eject body 12, debris is cleaned out of the tracks. Specifically, in the illustrated embodiment as shown in FIG. 15, each of the sleds 30 has a tapered configuration at both its front and end rear end that allows the sleds 30 to scrape debris away from the walls of the guide track 32 and direct the debris back towards the center of the rear ejectbody 12 as they move between the front and rear ends of the rear eject body 12. In this case, the forward end of each sled 30 includes upper and lower edges 36 (only the upper edge can be seen in FIG. 15) that angle inward and away from the body sidewalls 14 as the edges extend forward. Similarly, the rear end of each of the sleds 30 includes upper and lower edges 38 (only the upper edge can be seen in FIG. 15) that angle inward and away from the body sidewalls 14 as the edges extend rearward.

Figure 11:
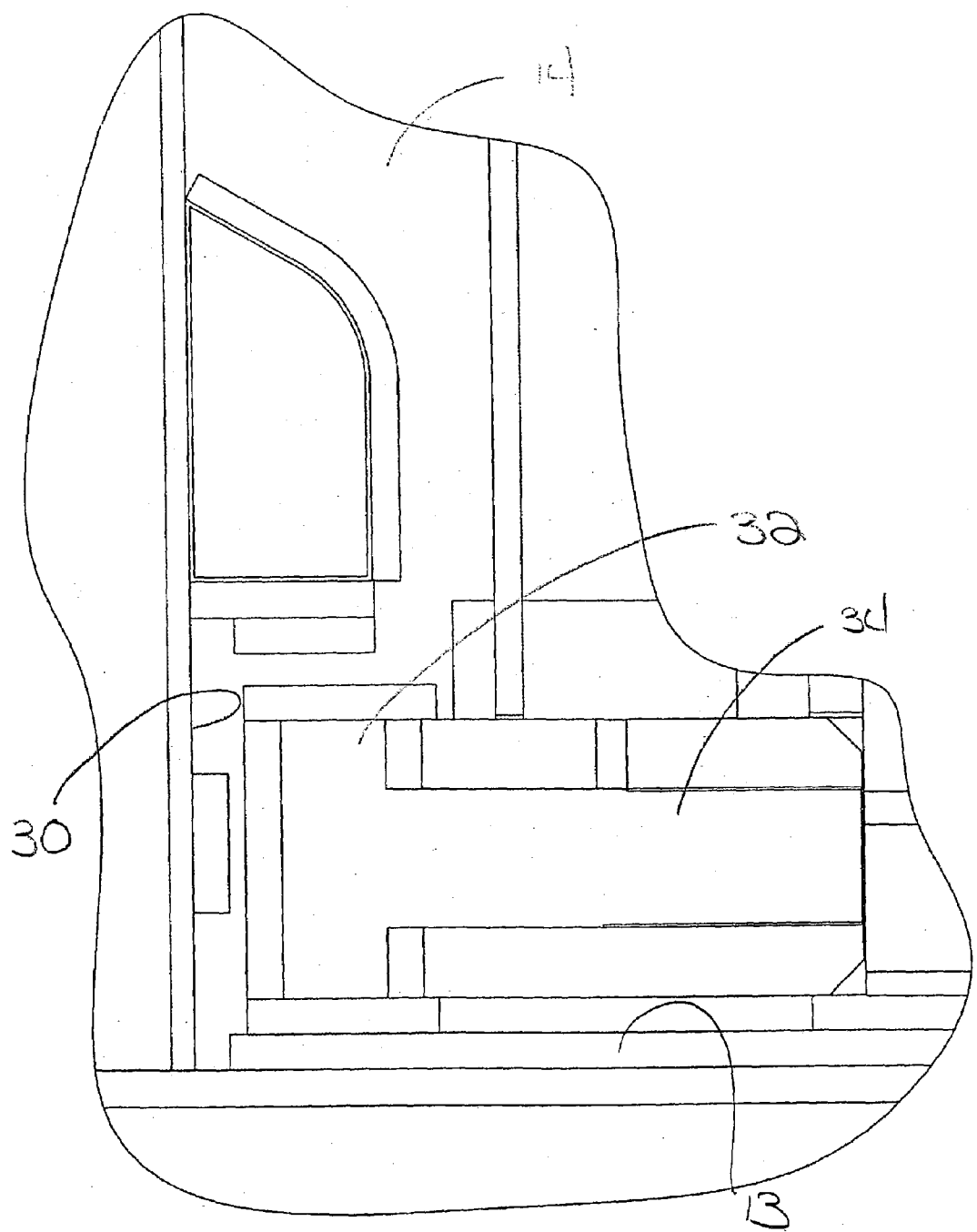
FIG. 11 is an enlarged end view of an alternative guide track/slide and sled arrangement for the rear eject body of the present invention.

To further facilitate cleaning of the guide tracks 32, the guide tracks 32 can be configured so as to have a bottom wall 40 angling downward and inward toward the center of the rear eject body 12 as it extends away from the body sidewall 14 as shown, for example, in FIGS. 9 and 10. When the sleds 30 slide back and forth in the guide tracks 32, the debris that is dislodged by the sleds 30 falls onto the bottom wall 40 of the guide track 32. Because it is set at an angle, the debris that falls on to the bottom wall 40 of the track 32 slides or is otherwise directed out of the guide track 32 and towards the center of the rear eject body 12. In the embodiment illustrated in FIGS. 9 and 10, the guide tracks 32 are also elevated a distance above the body floor 13. The elevation of the guide tracks 32 creates space for any debris that is expelled from the guide tracks 32. Alternatively, the guide tracks 32 could be arranged so as to be level with the body floor 13 as shown in FIG. 11.

To help prevent the ejector blade 18 from drifting rearward when the rear eject body 12 is empty, such as when the truck 10 is driven from a dump point back to a loading point, each of the guide tracks 32 can be configured with an incline near its forward end that the corresponding sleds 30 have to travel up when the ejector blade 18 first starts moving rearward. In the embodiment illustrated in FIG. 12, a short inclined track section 42 is provided in the bottom wall 40 at the forward end of each guide track 32. Each inclined track section 42 angles downward as it extends toward the forward end of the guide track 32. This downward angle creates a recess in which the forward sled 30 on each side of the ejector blade 18 rests when the ejector blade 18 is in the fully retracted position. Since these forward ejector blade sleds 30 must travel up the inclined track sections 42 in order to move rearward, the ejector blade 18 is essentially held by gravity at the forward end of the rear eject body 12 when the hydraulic cylinder 20 is retracted. In an alternative embodiment, a recessed flat track section 44 can be provided at the forward end of each guide track 32 as shown in FIG. 13. This recessed flat track section 44 is joined to the remainder of the guide track 32 by an inclined track section 42 that angles upward as it extends rearward in order to provide resistance to any rearward drift of the ejector blade 18. The recessed, flat track section 44 permits the sleds 30 to be oriented parallel to the ground when the ejector blade 18 is fully forward. The inclined track section 42 shown in FIG. 13 is at a slightly steeper angle than the inclined track section 42 of FIG. 12. As a result, the inclined track section 42 of FIG. 13 offers more resistance to any rearward drift of the ejector blade 18.

To reduce the friction associated with ejecting material from the rear eject body 12, the floor 13 of the rear eject body 12 can be lined with a material having a low coefficient of friction as compared to conventional steel plate. Using a material with a relatively low coefficient of friction reduces the amount of force necessary to eject material from the rear eject body 12. As a result, a relatively smaller hydraulic cylinder 20 can be used to move the ejector blade 18 thereby reducing the cost of the rear eject body 12. The use of a low coefficient of friction material also results in a relatively faster movement of the ejector blade 18 between the retracted and extended positions. Two examples of suitable materials for lining the body floor 13 are Hadfield manganese steel and the wear plate sold under the Arcoplate tradename mentioned above. As noted above, both Hadfield manganese steel and Arcoplate wear plate are extremely hard, and when polished, have an extremely low coefficient of friction. Advantageously, these materials are also very resistant to abrasion and wear caused by material sliding across the body floor 13.

Figure 2:
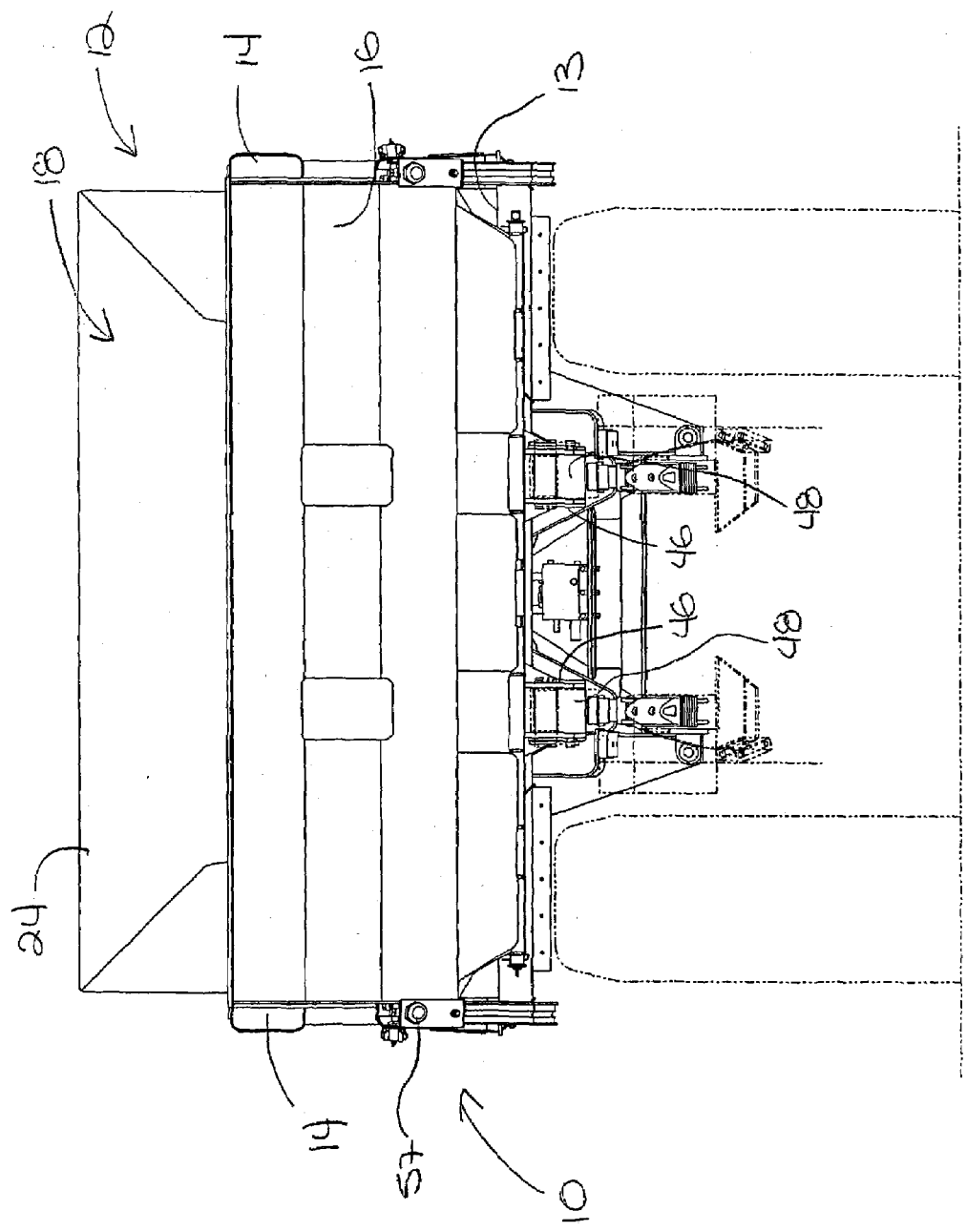
FIG. 2 is a rear view of the truck and rear eject body of FIG. 1 showing the ejector blade retracted and the tailgate closed.
Figure 3:
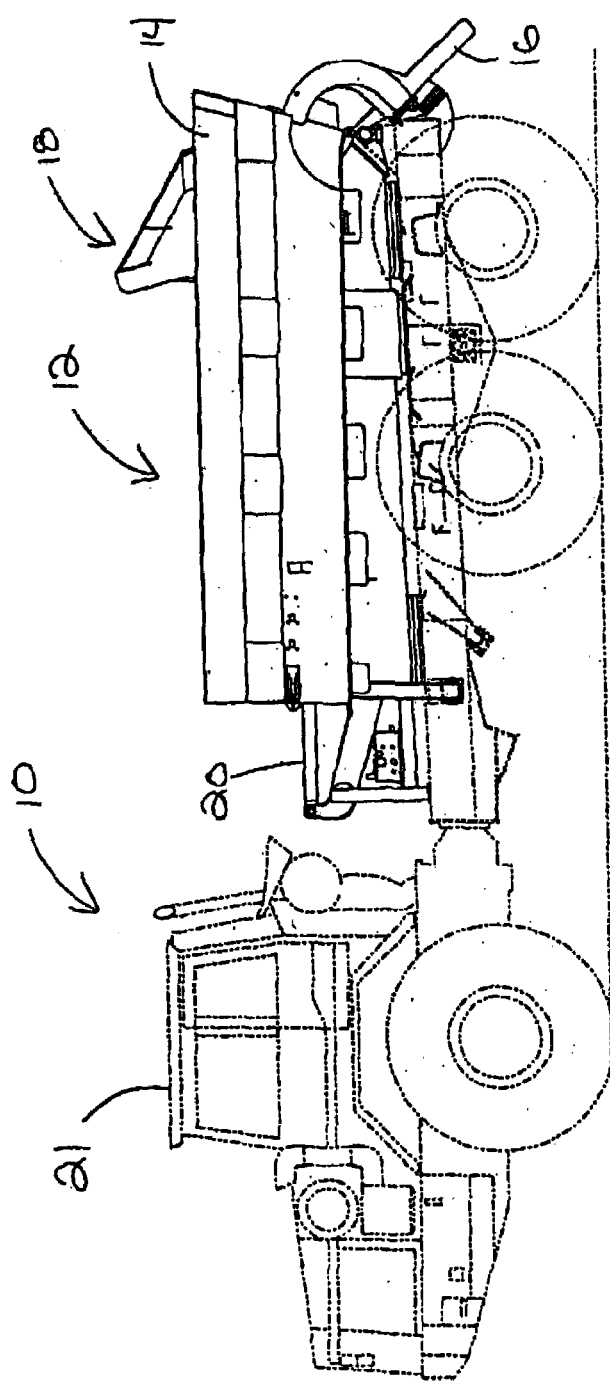
FIG. 3 is a side view of the truck and rear eject body of FIG. 1 showing the ejector blade extended and the tailgate open.
Figure 37:
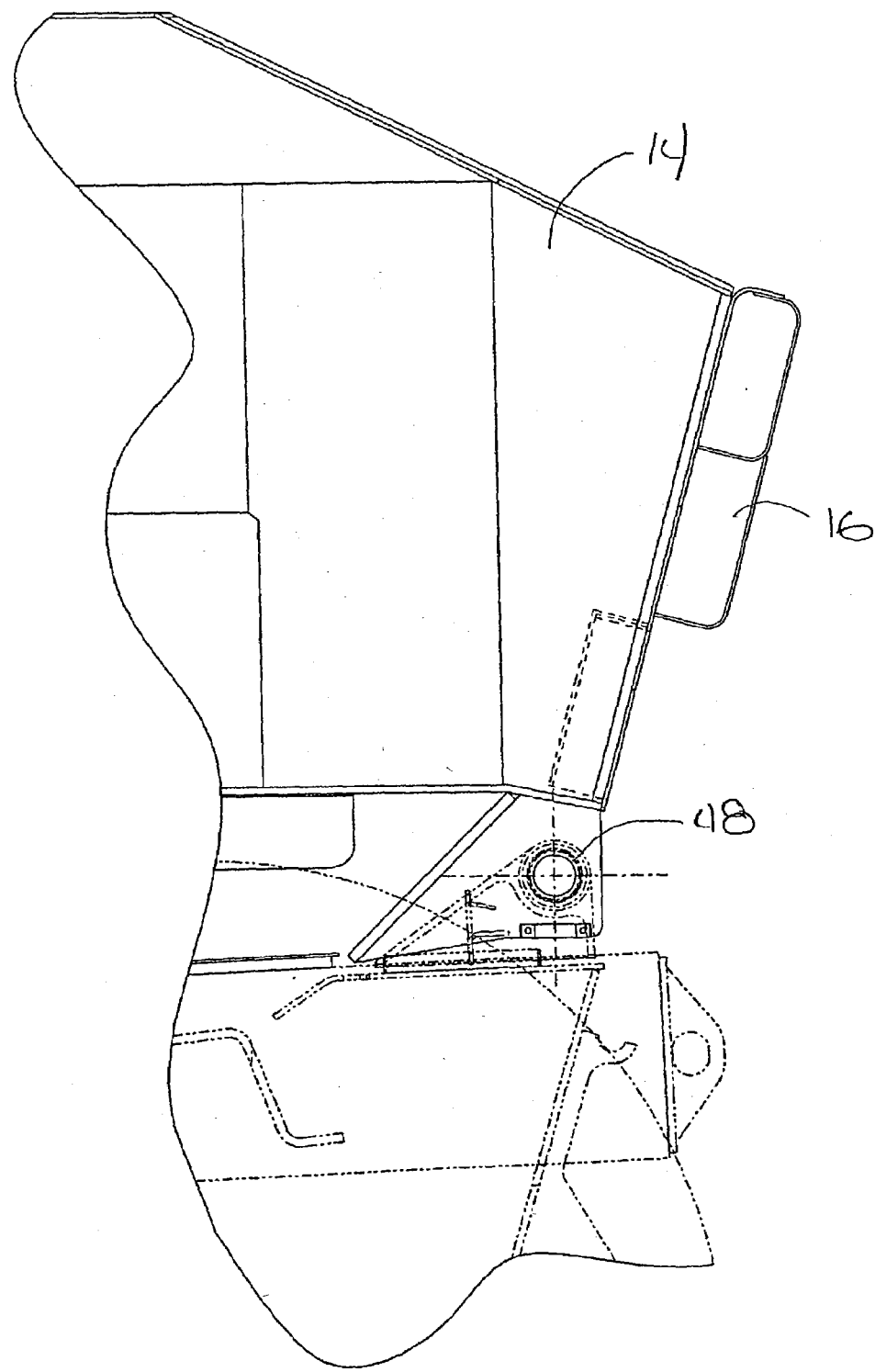
FIG. 37 is an enlarged partial side view of a rear eject body according to the present invention which has an alternative tailgate pivot arrangement showing the tailgate in the closed position.
Figure 38:
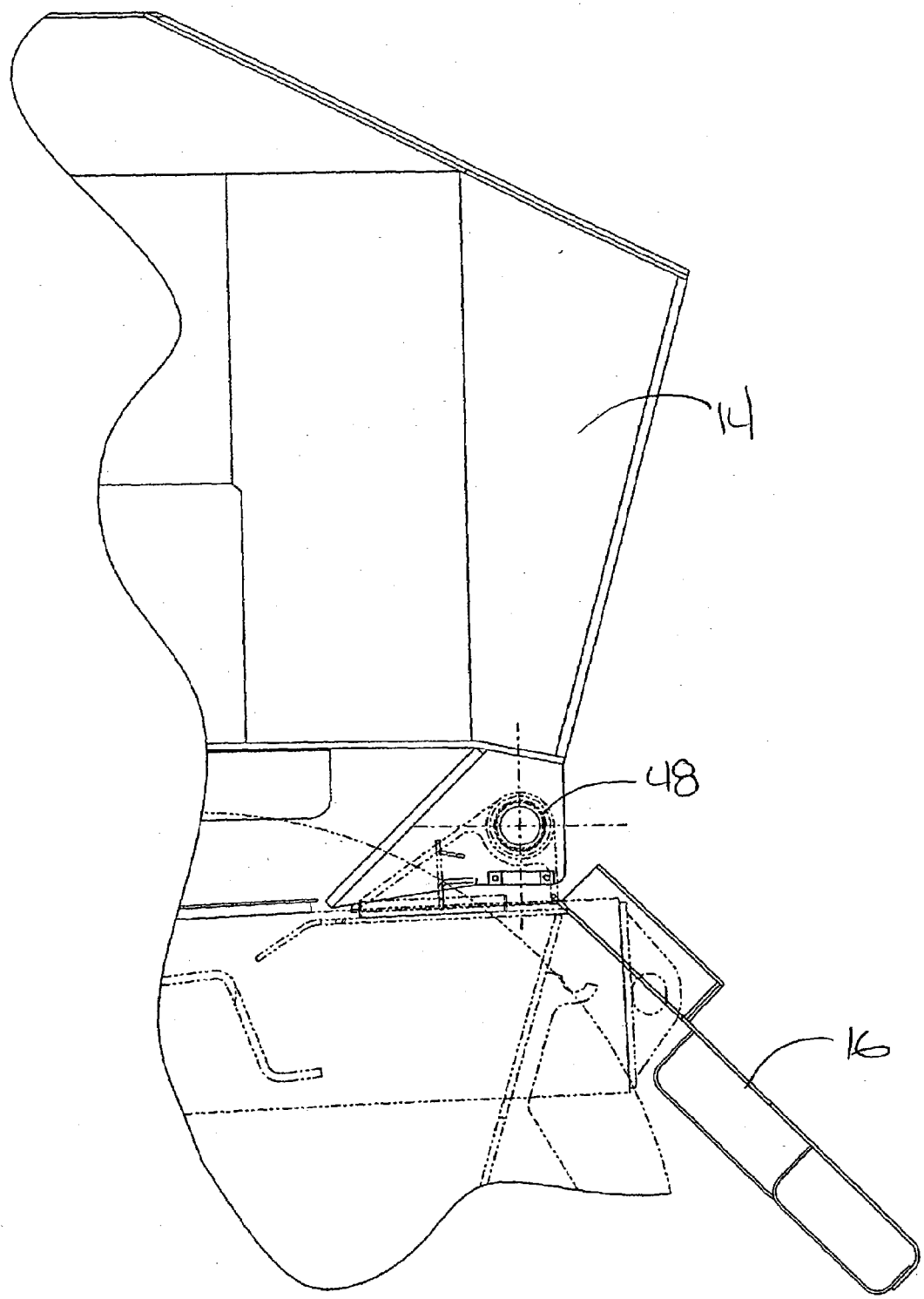
FIG. 38 is an enlarged partial side view of the rear eject body of FIG. 37 showing the tailgate in the open position.

To allow the illustrated rear eject body 12 to be easily mounted to existing trucks that are configured to receive a pivotable dump body, the rear eject body 12 can be configured to be mountable to the standard truck chassis dump body pivot mounts. In particular, as best shown in FIGS. 1, 2 and 5, a pair of mounting brackets 46 are provided on the underside of the body floor 13 adjacent the rear end thereof. When installing the rear eject body 12, these mounting brackets 46 can be connected to the dump body pivot mounts 48 that are typically provided on a truck chassis configured to receive a pivotable dump body such as in the illustrated embodiment (see, e.g., FIGS. 1 and 2). Alternatively, the dump body pivot mounts 48 on the truck chassis could also be used as the pivot points for the tailgate 16 such as shown in FIGS. 37 and 38.

To control movement of the tailgate 16 between the open and closed positions so that the load can be ejected out of the body, the illustrated rear eject body 12 includes a tailgate actuation system 50 (best shown, for example, in FIGS. 14-28). Advantageously, unlike many rear eject bodies that use separate hydraulic cylinders at the rear of the body to move the tailgate, the tailgate actuation system 50 utilizes a single hydraulic cylinder 20 to operate both the ejector blade 18 and tailgate 16. This reduces the required maintenance as well as the cost of the rear eject body 12 by eliminating the additional hydraulic cylinders, hydraulic lines and hydraulic controls conventionally associated with operating the tailgate. The tailgate actuation system 50 links movement of the tailgate 16 to movement of the ejector blade 18 helping to ensure that the tailgate 16 opens quickly and reliably during dumping. In particular, the actuation of the ejector blade 18 from the fully retracted position to a partially extended position controls the opening and closing of the tailgate 16 at the rear of the rear eject body 12.

Figure 14:
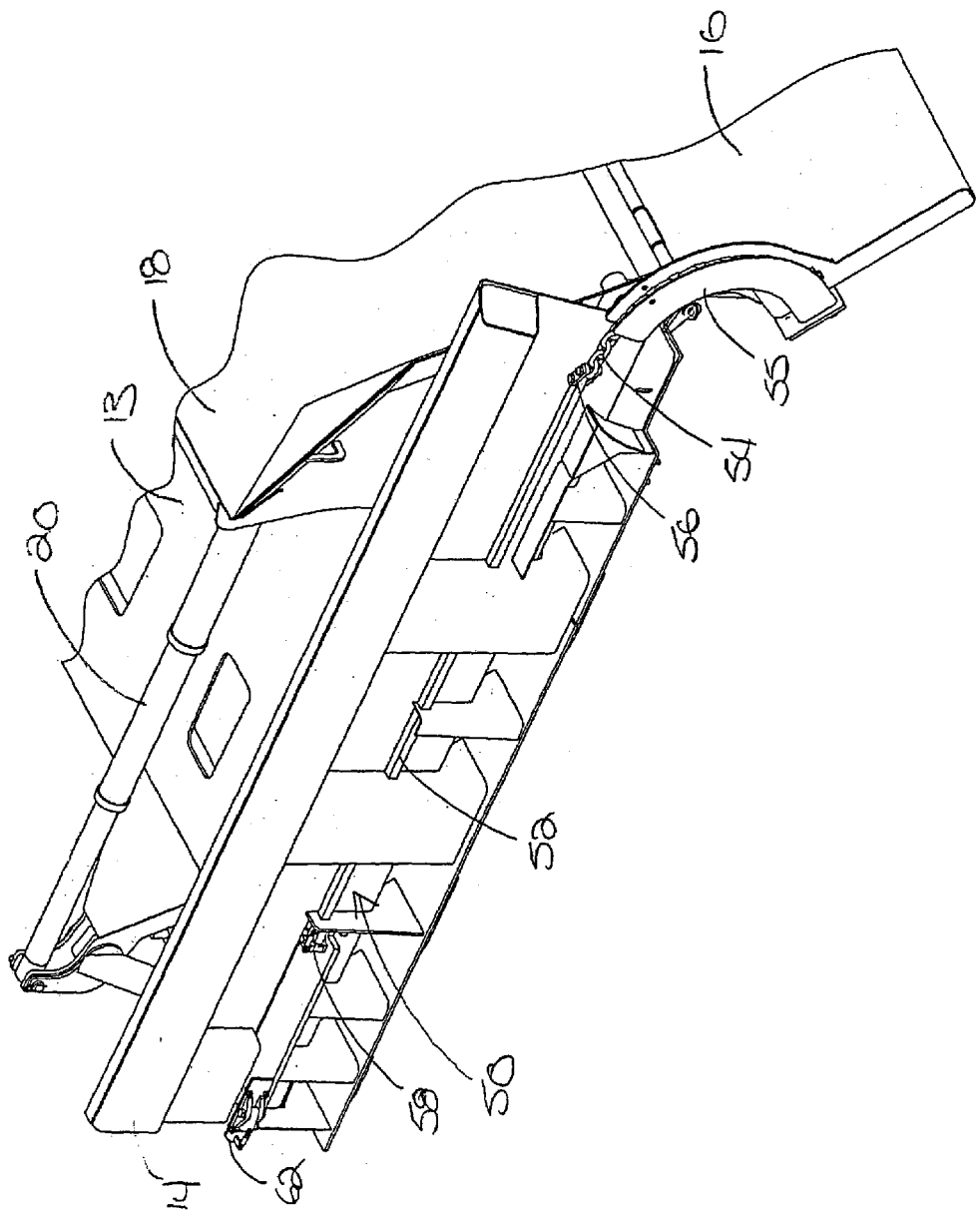
FIG. 14 is a partial perspective view of the rear eject body of FIG. 1 with a portion of one of the body sidewalls cutaway so as to show the tailgate actuation system.
Figure 16:
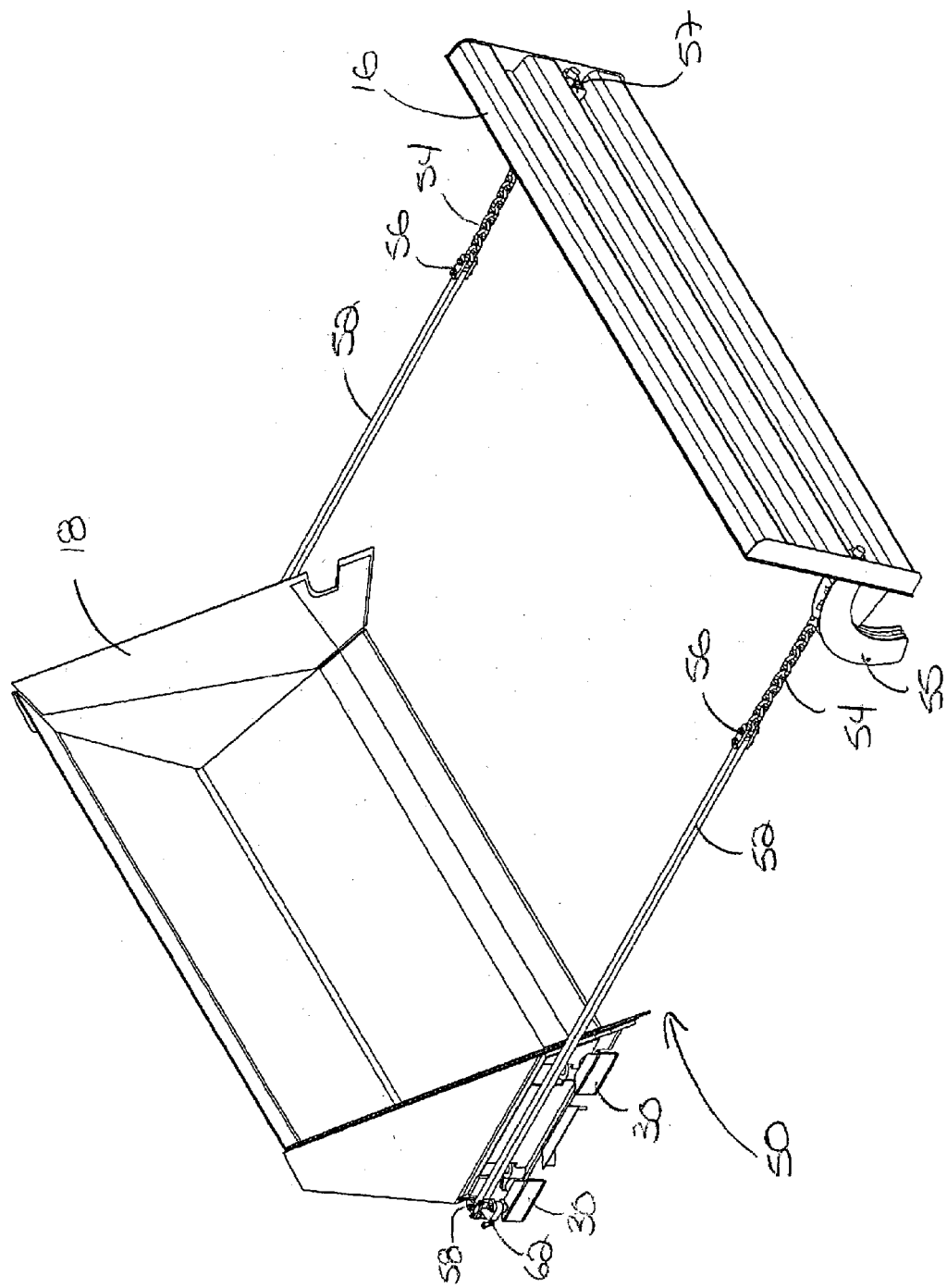
FIG. 16 is a perspective view of the ejector blade and tailgate actuation system of the rear eject body of FIG. 1 showing the ejector blade in the fully retracted position and the tailgate closed.
Figure 17:
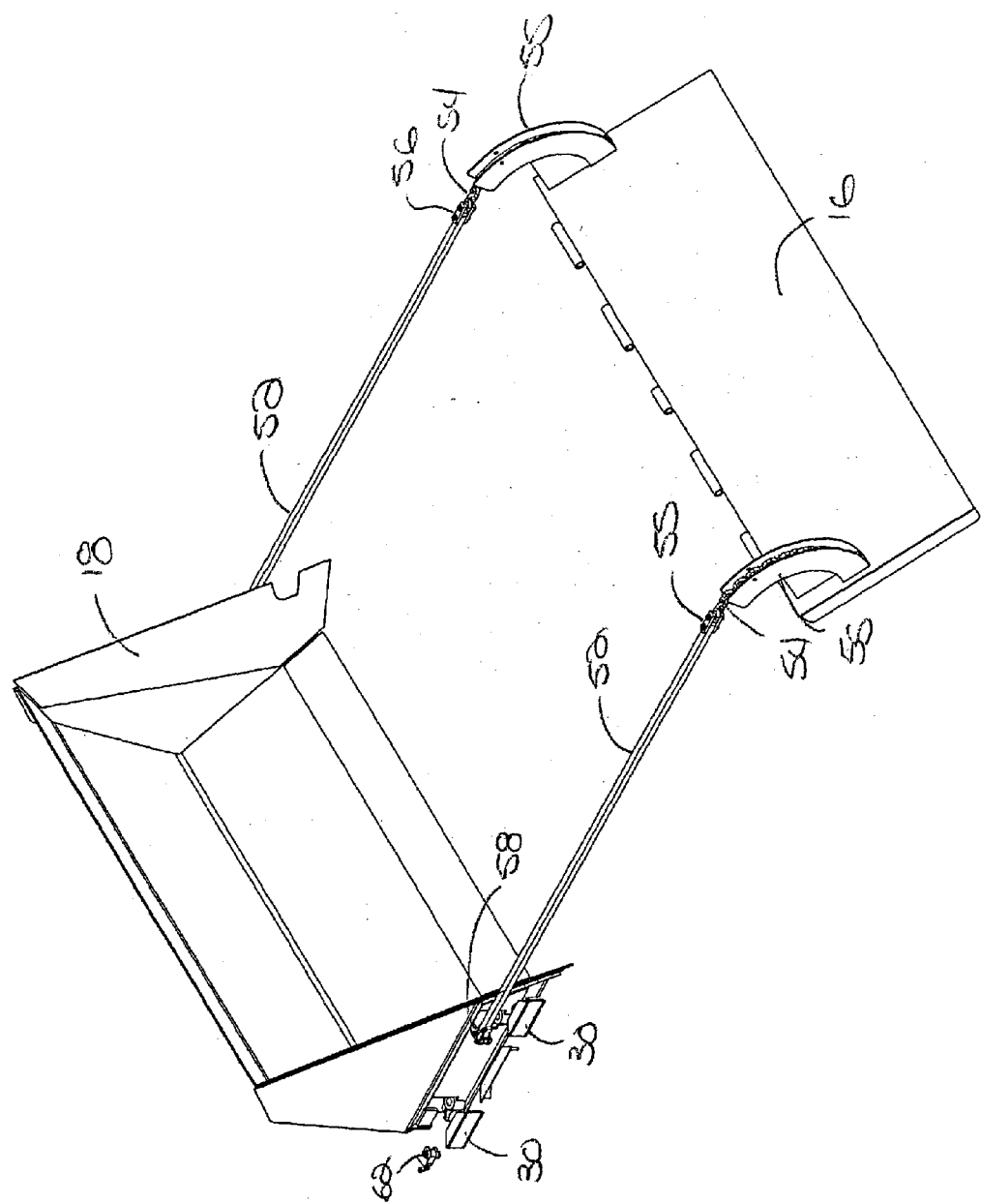
FIG. 17 is a perspective view of the ejector blade and tailgate actuation system of the rear eject body of FIG. 1 showing the ejector blade after it has started moving rearward towards the extended or eject position and the tailgate in the open position.

In the illustrated embodiment, the tailgate actuation system 50 includes a release rod 52 to which a chain 54 is attached as shown in FIGS. 14, 16 and 17. The chain 54, in turn, wraps around a chain drum 55 and connects to the tailgate 16. Specifically, in the illustrated embodiment, the chain 54 is connected to the chain drum 55 using a chain tensioner 57 (FIGS. 2, 5, 16, 29, 30 and 32 a-c), which is adjustable via a large nut on a threaded rod to ensure that the tailgate 16 fits tightly against the sidewalls 14 of the rear eject body 12 when in the closed position. A tailgate release lever 58 is pivotally mounted on the forward end of the release rod 52. The tailgate release lever 58, rod 52 and chain 54 assembly extends along the outside surface of one or both of the plates of the sidewalls 14 of the rear eject body 12 such as shown in FIG. 14 (for the sake of clarity the outer structure of the sidewall 14 is removed in FIG. 14).

Figure 18:
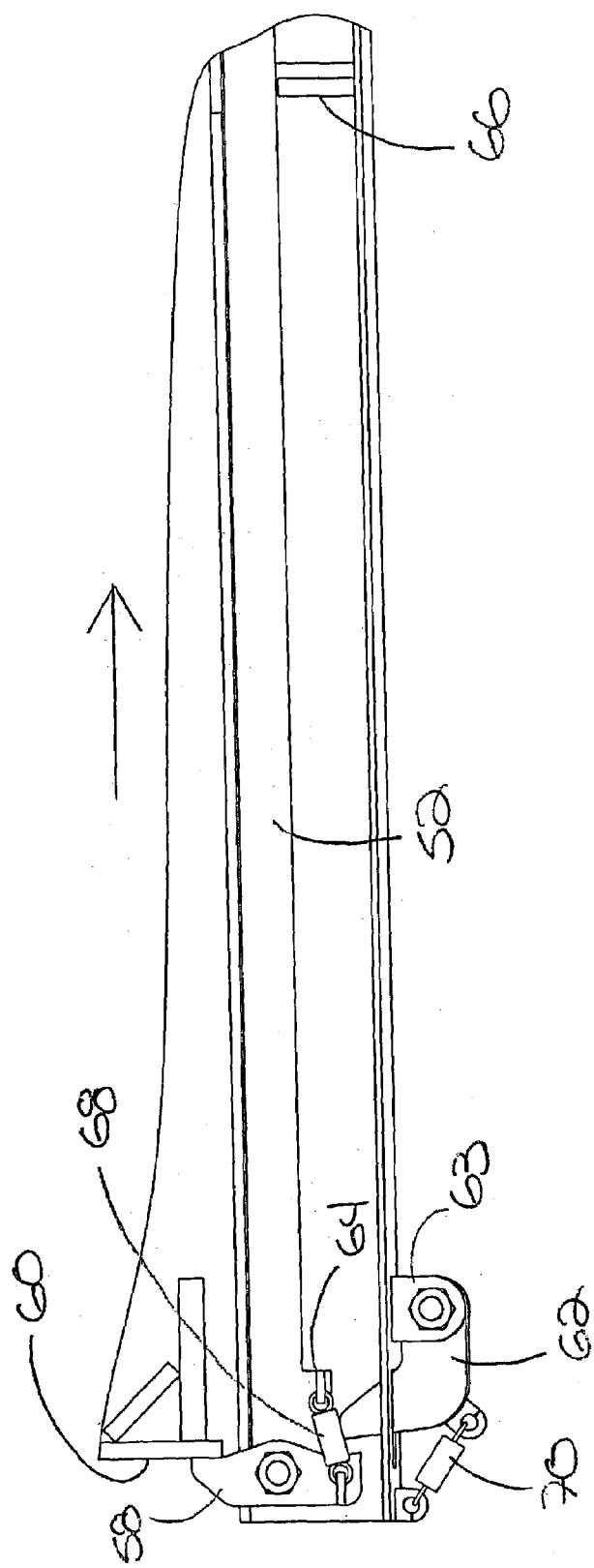
FIGS. 18-28 are enlarged partial top plan views of the ejector blade and tailgate actuation system of the rear eject body of FIG. 1 showing the sequence of operation of the tailgate actuation system as the ejector blade moves from the fully retracted position to the extended position and back to the fully retracted position. The direction of travel of the ejector blade is indicated by the respective arrows.
Figure 19:
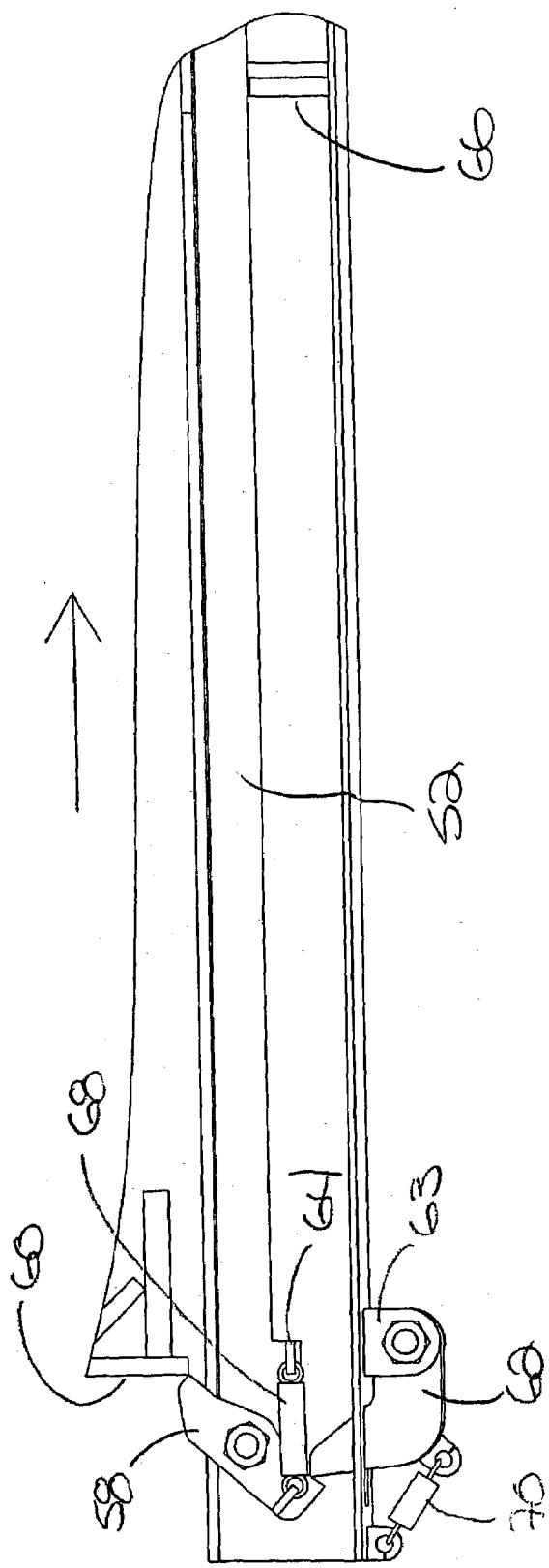
Figure 20:
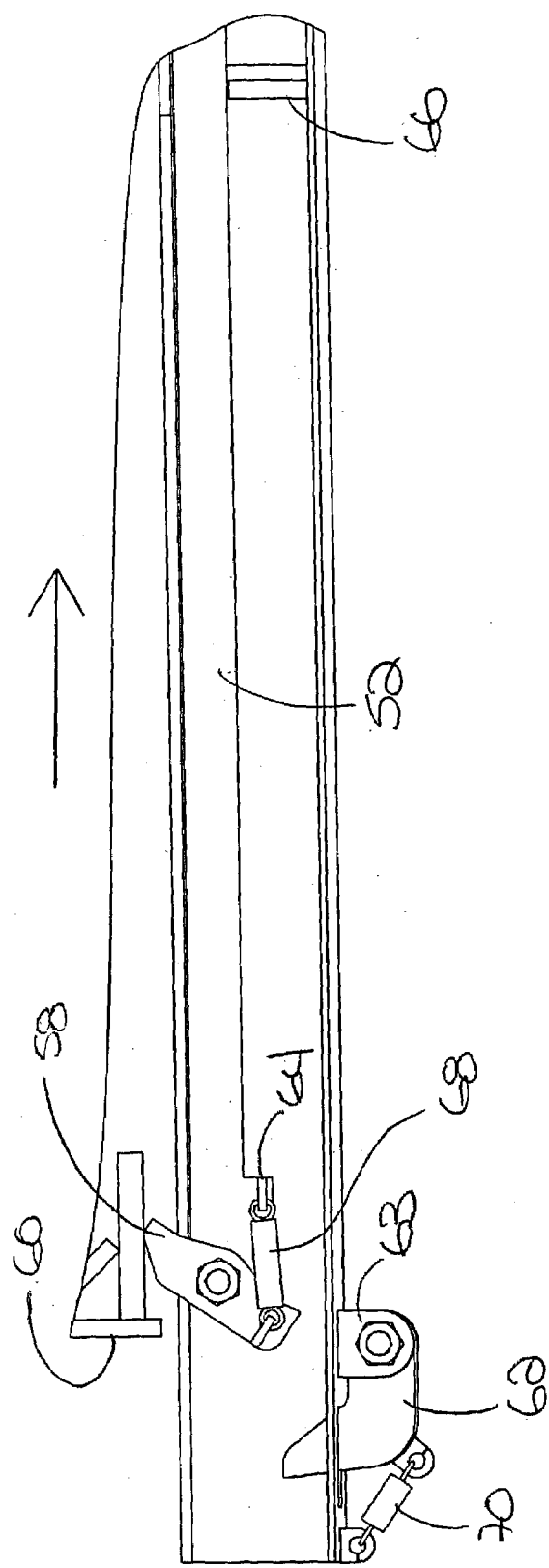
Figure 21:
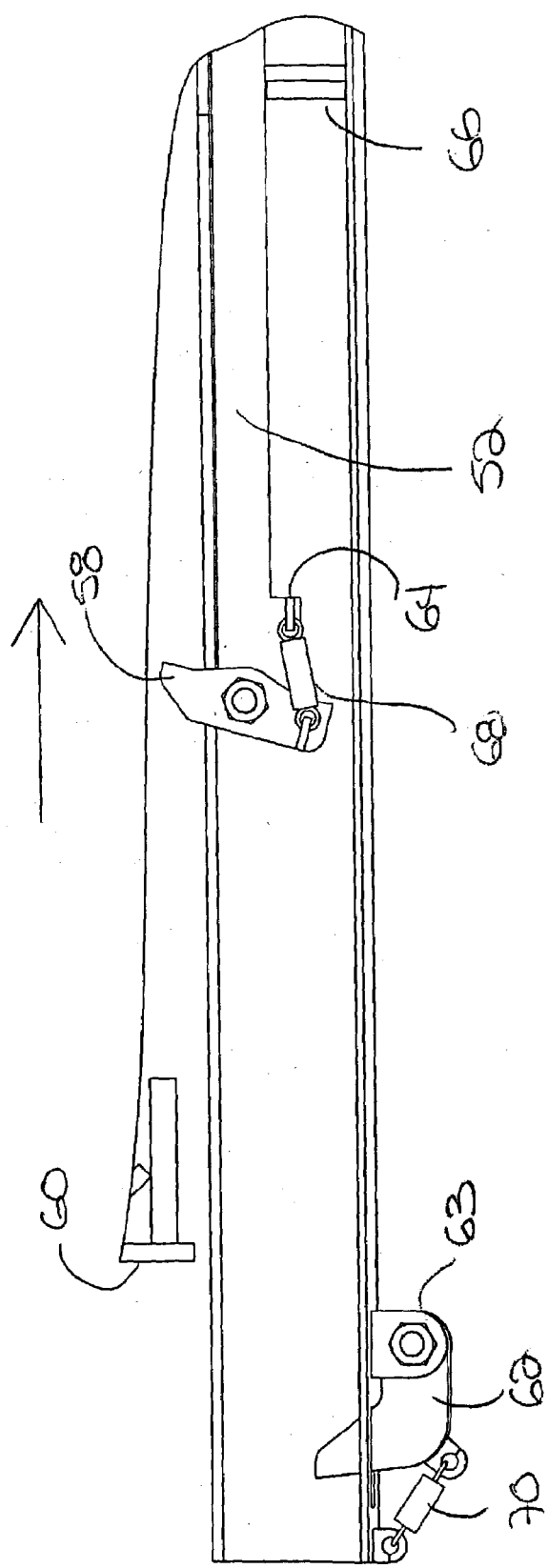
Figure 22:
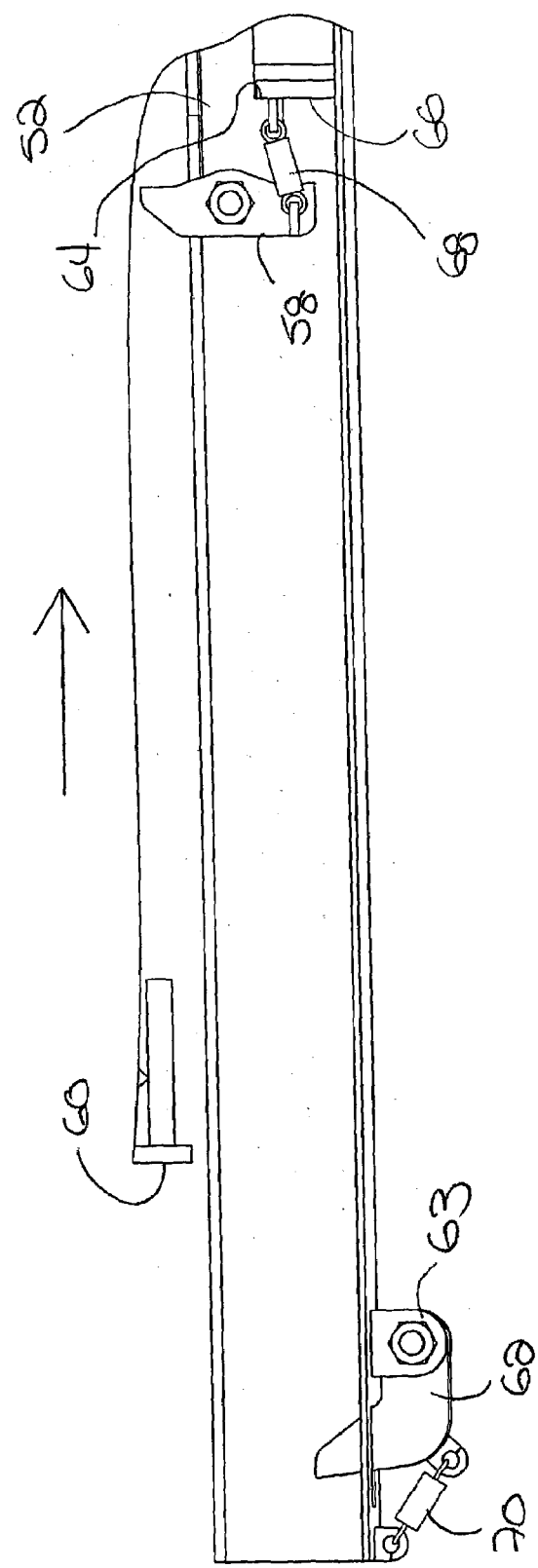
Figure 23:
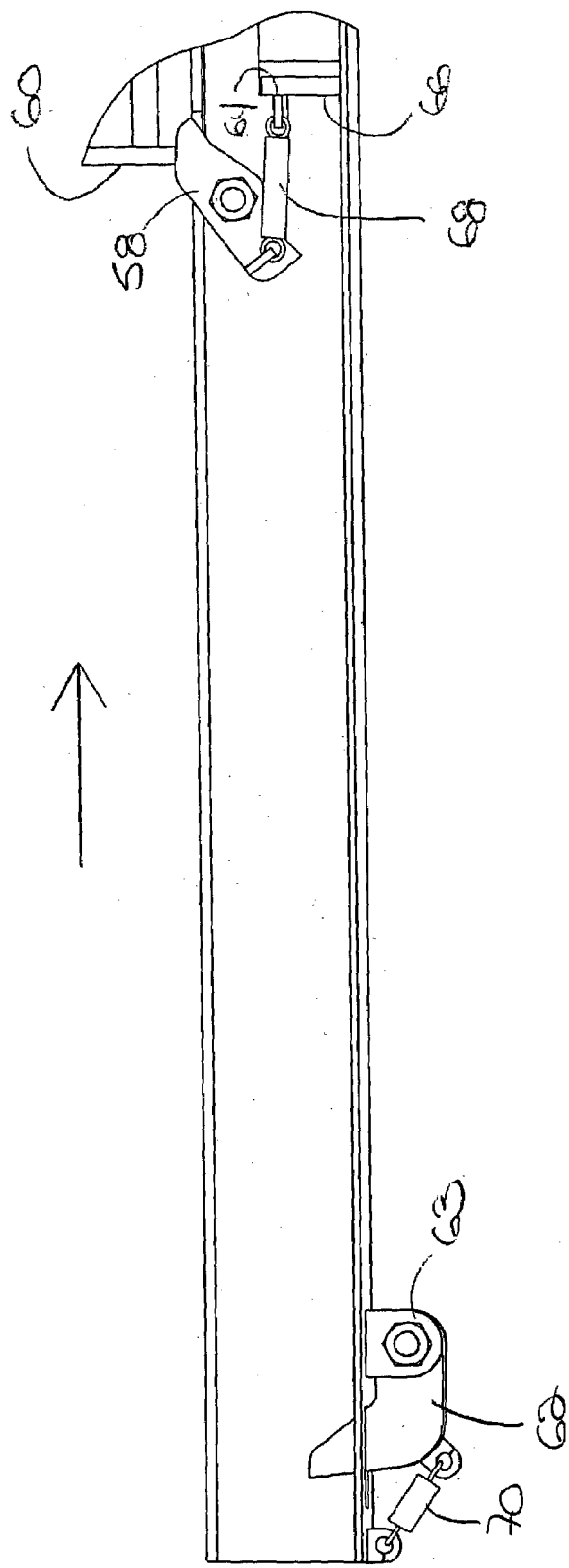
Figure 24:
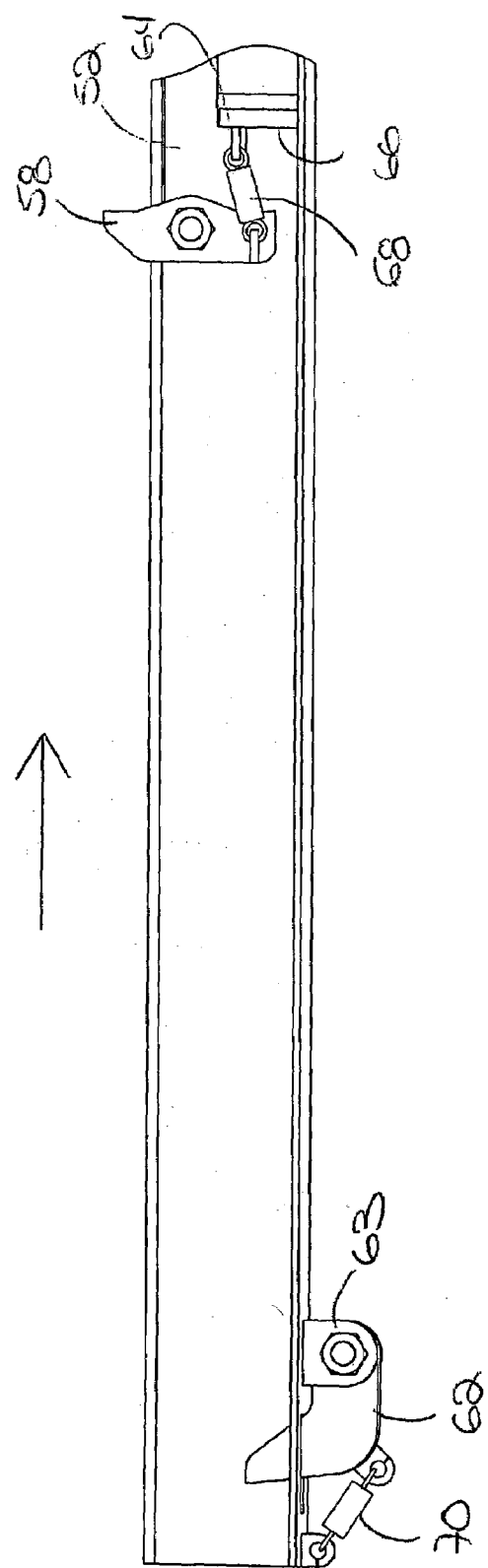

With the ejector blade 18 fully retracted, the tailgate 16 is held closed by the engagement of the tailgate release lever 58 with a stop surface 60 on the ejector blade 18 (see FIGS. 15, 16, and 18). As the ejector blade 18 starts to move rearward in order to eject a load, the release rod 52 starts to slide rearward (pulled by the weight of the tailgate 16) and engages a quick release dog 62 which is pivotally supported via a pair of mounting ears 63 on the sidewall 14 of the rear eject body 12. The engagement of the tailgate release lever 58 with the quick release dog 62 pivots the gate release lever 58 in a clockwise direction (with respect to the drawings) relative to the release rod 52 (see FIG. 19). This disengages the tailgate release lever 58 from the stop surface 60 on the ejector blade 18 (see FIGS. 20 and 21). The release rod 52 then slides rearward until a notch 64 on the release rod 52 engages a stop surface 66 provided in the sidewall 14 of the rear eject body 12 (see FIG. 22). At this point, the tailgate 16 has swung into the fully open position.

As the ejector blade 18 continues to move rearward to eject the load, the ejector blade 18 again engages the tailgate release lever 58. This pivots the tailgate release lever 58 in the clockwise direction so that the ejector blade 18 can pass by the tailgate release lever 58 (see FIG. 23). Once the ejector blade 18 is past the tailgate release lever 58, a spring 68 which extends between the tailgate release lever 58 and the release rod 52 pivots the tailgate release lever 58 back into a position wherein the tailgate release lever 50 extends perpendicularly relative to the release rod 52 (see FIG. 24).

Figure 25:
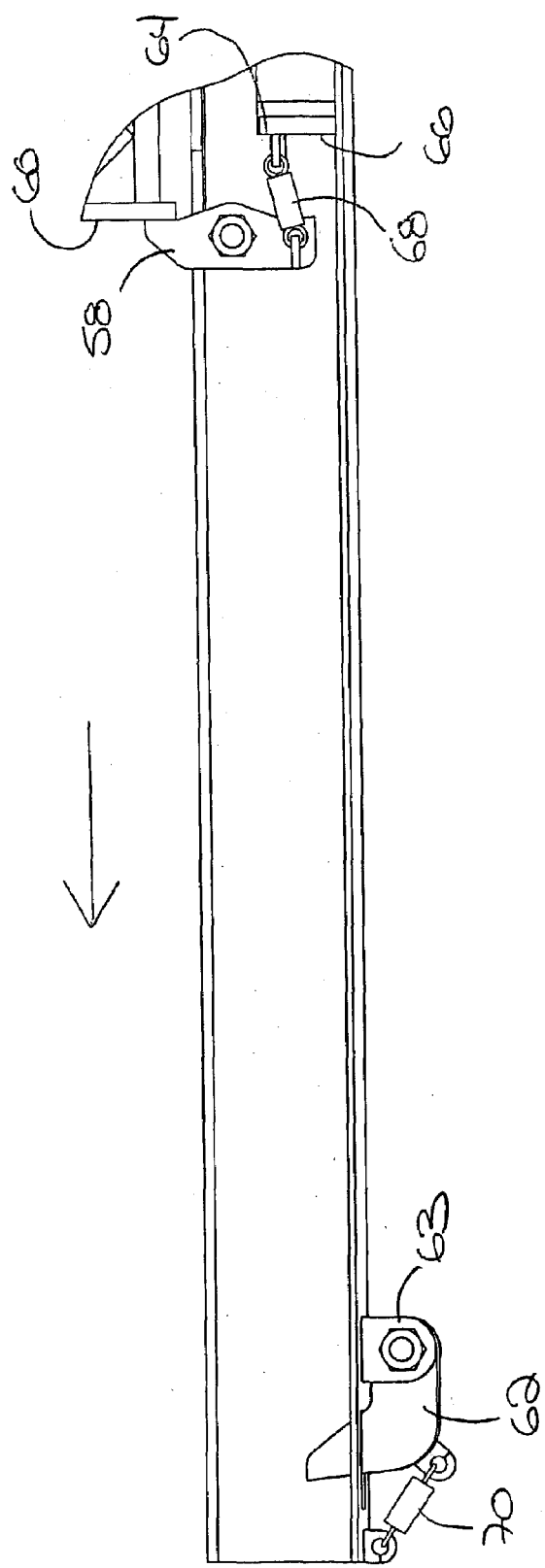
Figure 26:
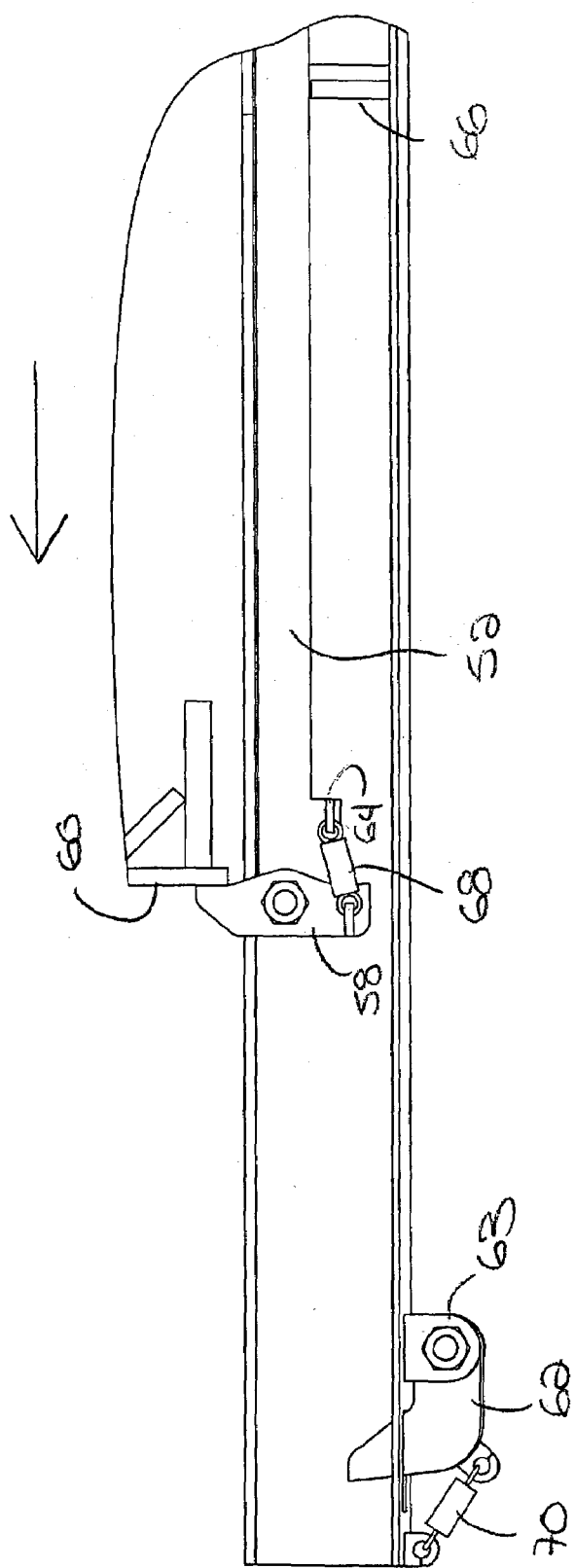
Figure 27:
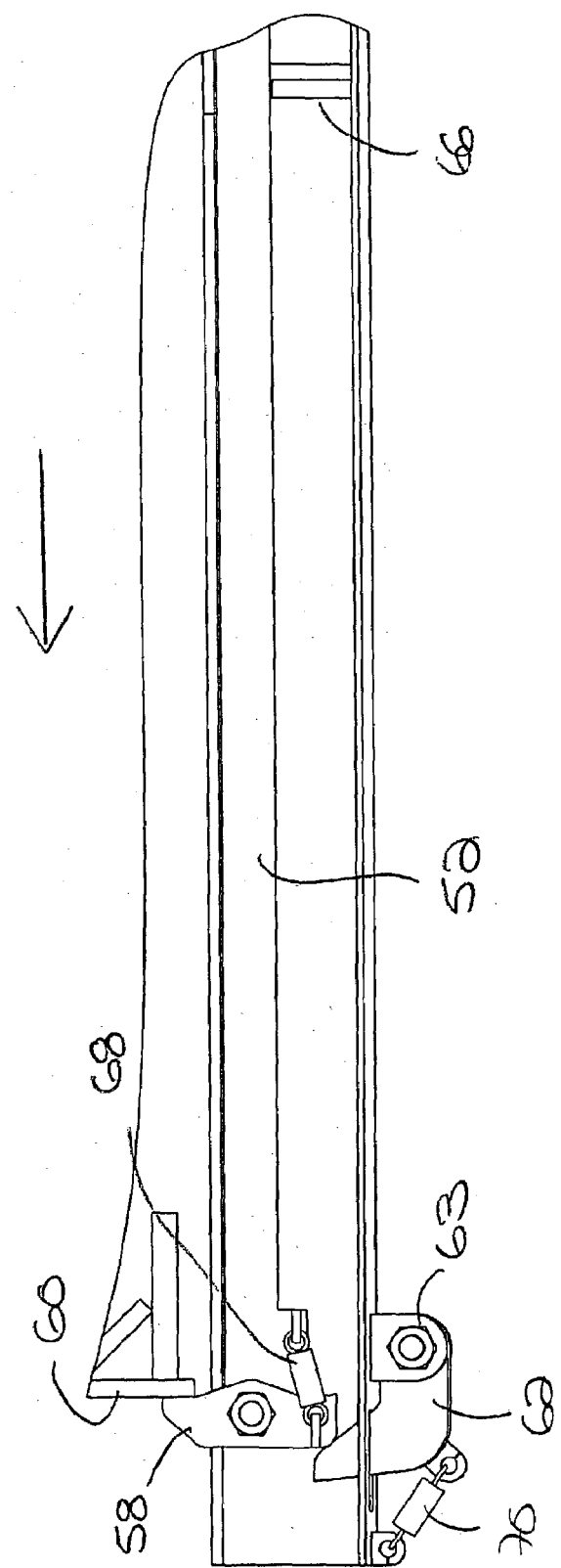
Figure 28:
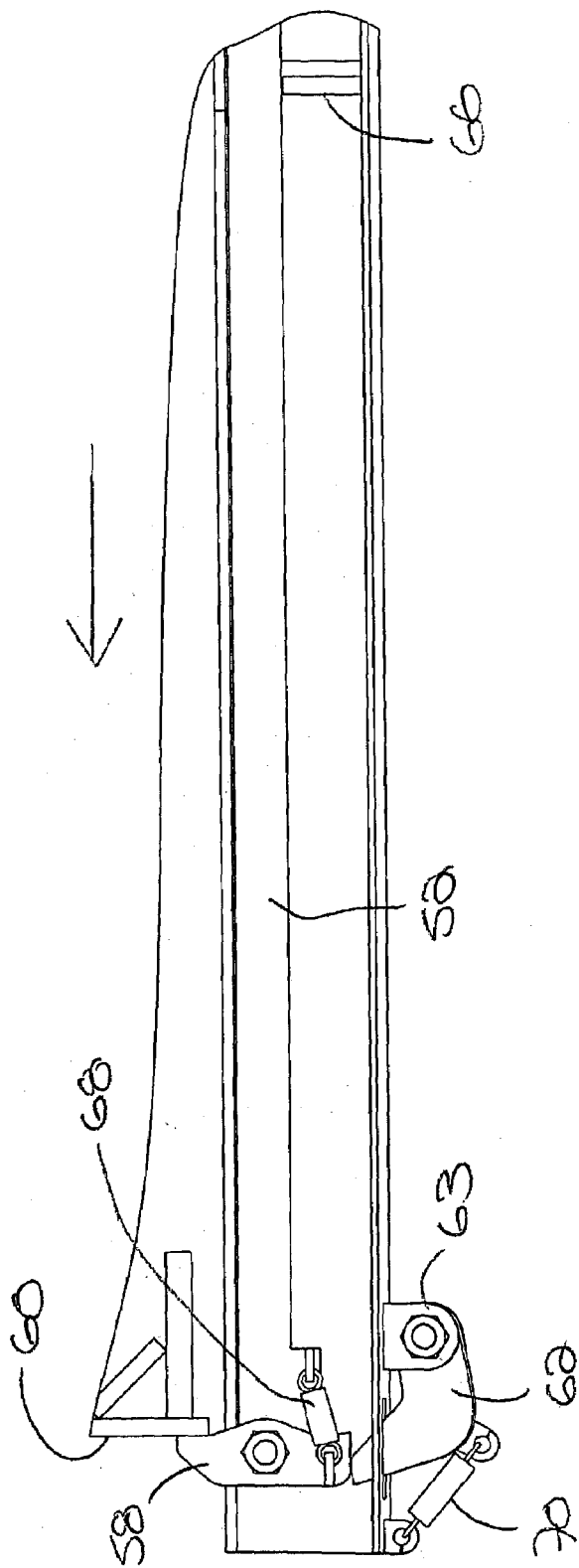
Figure 29:
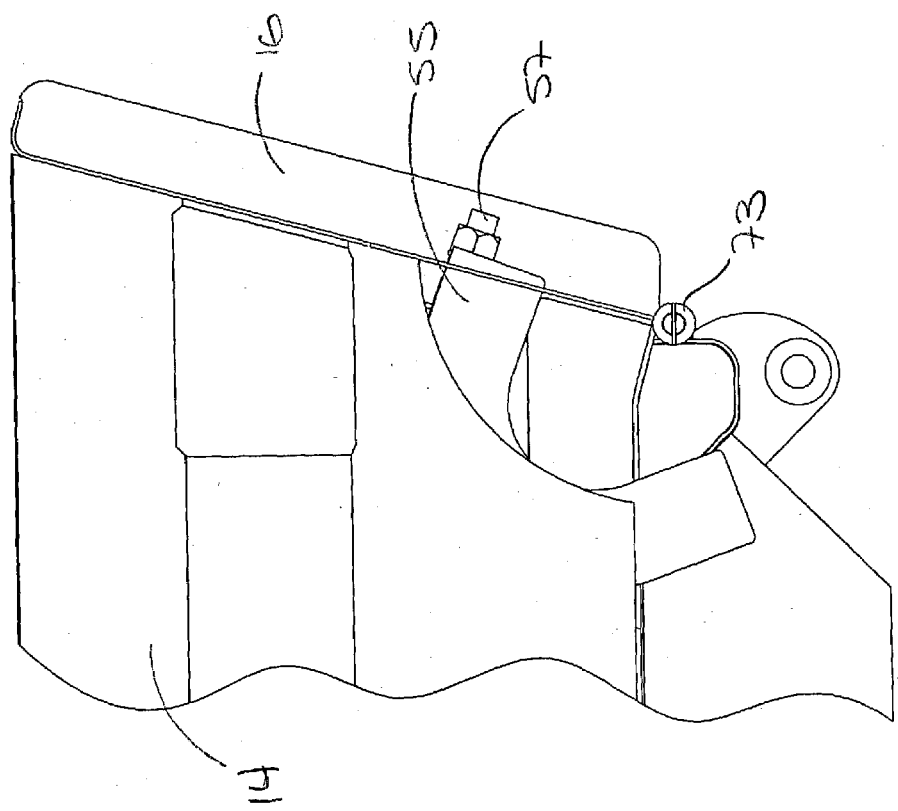
FIG. 29 is an enlarged partial side view of the rear eject body of FIG. 1 showing the tailgate in the nearly vertical or closed position.
Figure 30:
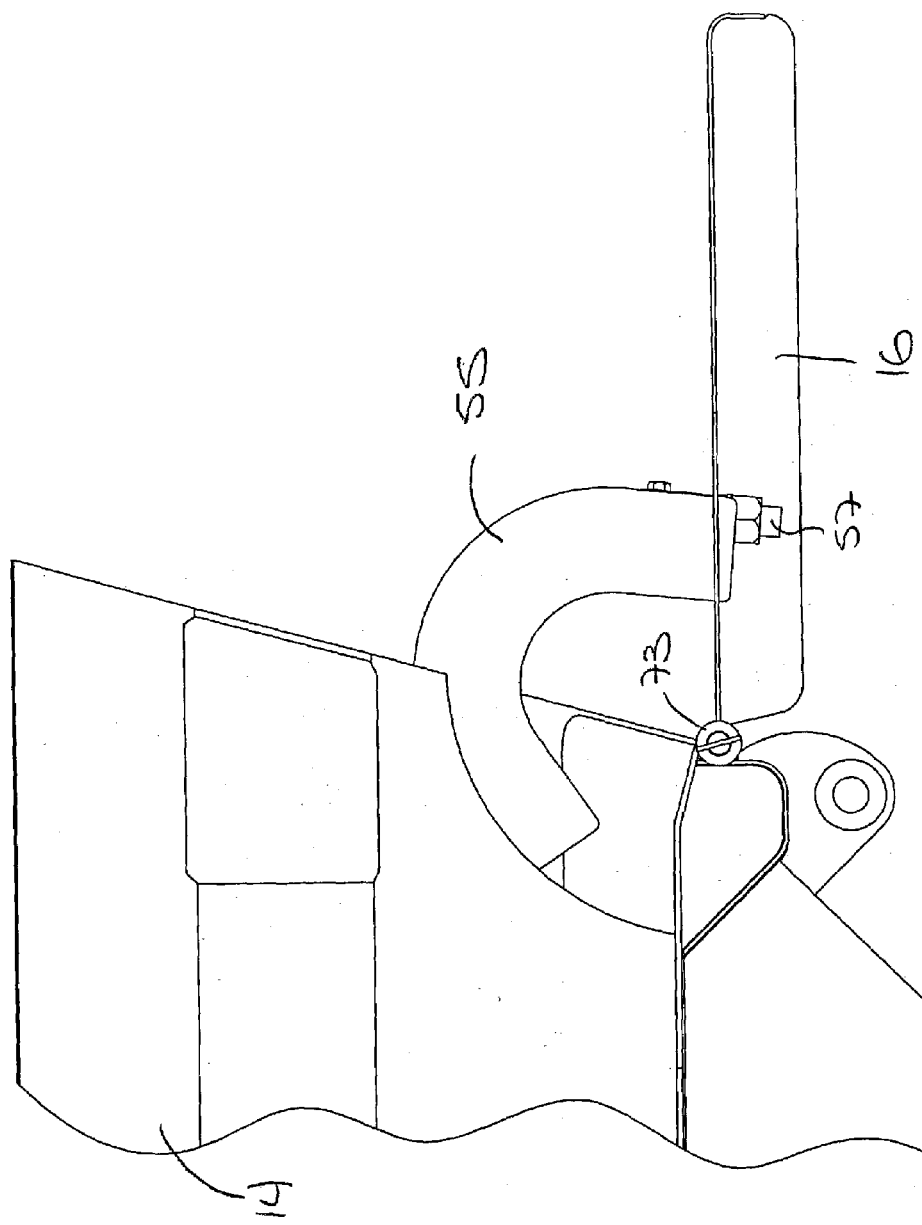
FIG. 30 is an enlarged partial side view of the rear eject body of FIG. 1 showing the tailgate in a horizontal position between the closed and open positions.
Figure 31:
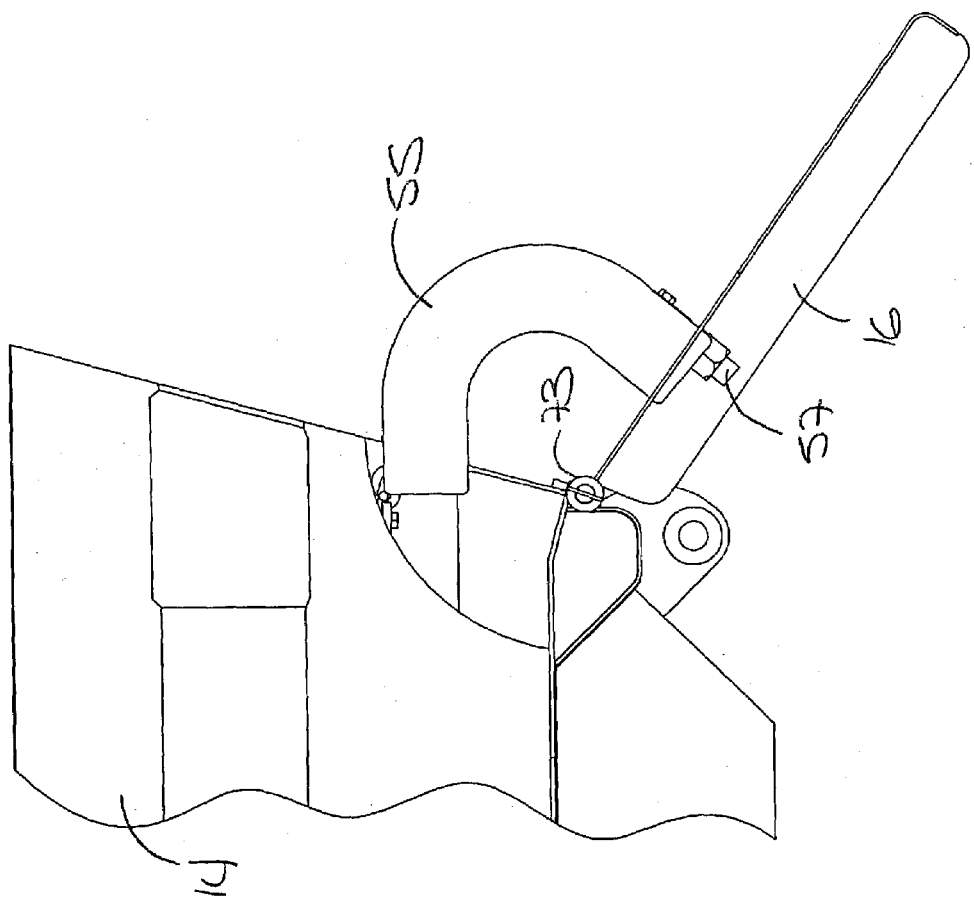
FIG. 31 is an enlarged partial side view of the rear eject body of FIG. 1 showing the tailgate in the nearly open position.

As the ejector blade 18 moves back to the fully retracted position, the stop surface 60 on the ejector blade 18 once again engages the tailgate release lever 58, in this case, when the ejector blade 18 is approximately 80% of the way back to the retracted position (see FIG. 25). The release rod 52 is configured to prevent the tailgate release lever 58 from pivoting past perpendicular in the counter-clockwise direction relative to the release rod 52. Accordingly, when the ejector blade 18 engages the tailgate release lever 58 as the ejector blade 18 returns to the fully retracted position, it pulls the release rod 52 and chain 54 forward (see FIG. 26) and thereby rotates the tailgate 16 back into the closed position. The quick release dog 62 on the sidewall 14 of the rear eject body 12 is pivotal so that the tailgate release lever 58 can move forward past the quick release dog 62 into the fully retracted and closed position (see FIGS. 27, 28 and 18). A spring 70 then pivots the quick release dog 62 inward or clockwise back behind the gate release lever 58 (see FIG. 18).

Advantageously, when a load is being ejected, the tailgate 16 is released and is fully open after very minimal rearward movement of the ejector blade 18 so that the load can be ejected from the rear eject body 12 (e.g., after approximately six inches rearward movement of the ejector blade 18). In the embodiment illustrated in FIGS. 14-28, the ejector blade 18 only needs to move approximately 3-5% of the total ejector blade 18 rearward movement to fully release the tailgate 16. In contrast, 17-25% of the total ejector blade 18 forward or retraction movement is used to move the tailgate 16 into the closed position.

Figure 12:
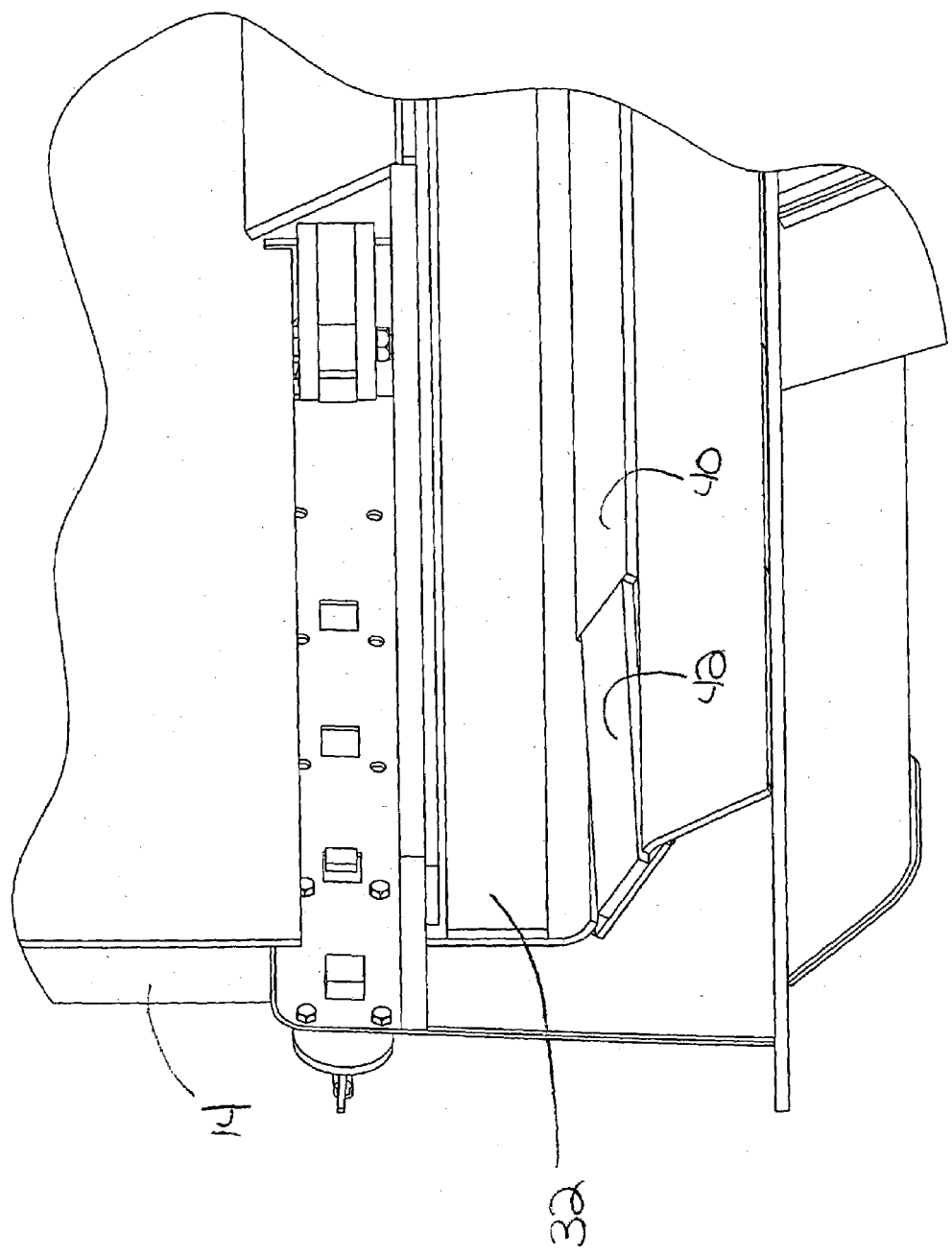
FIG. 12 is an enlarged partial side perspective view of the rear eject body of FIG. 1 showing the inclined section of one of the guide tracks at the forward end of the rear eject body which helps retain the ejector blade in the retracted position.
Figure 3:
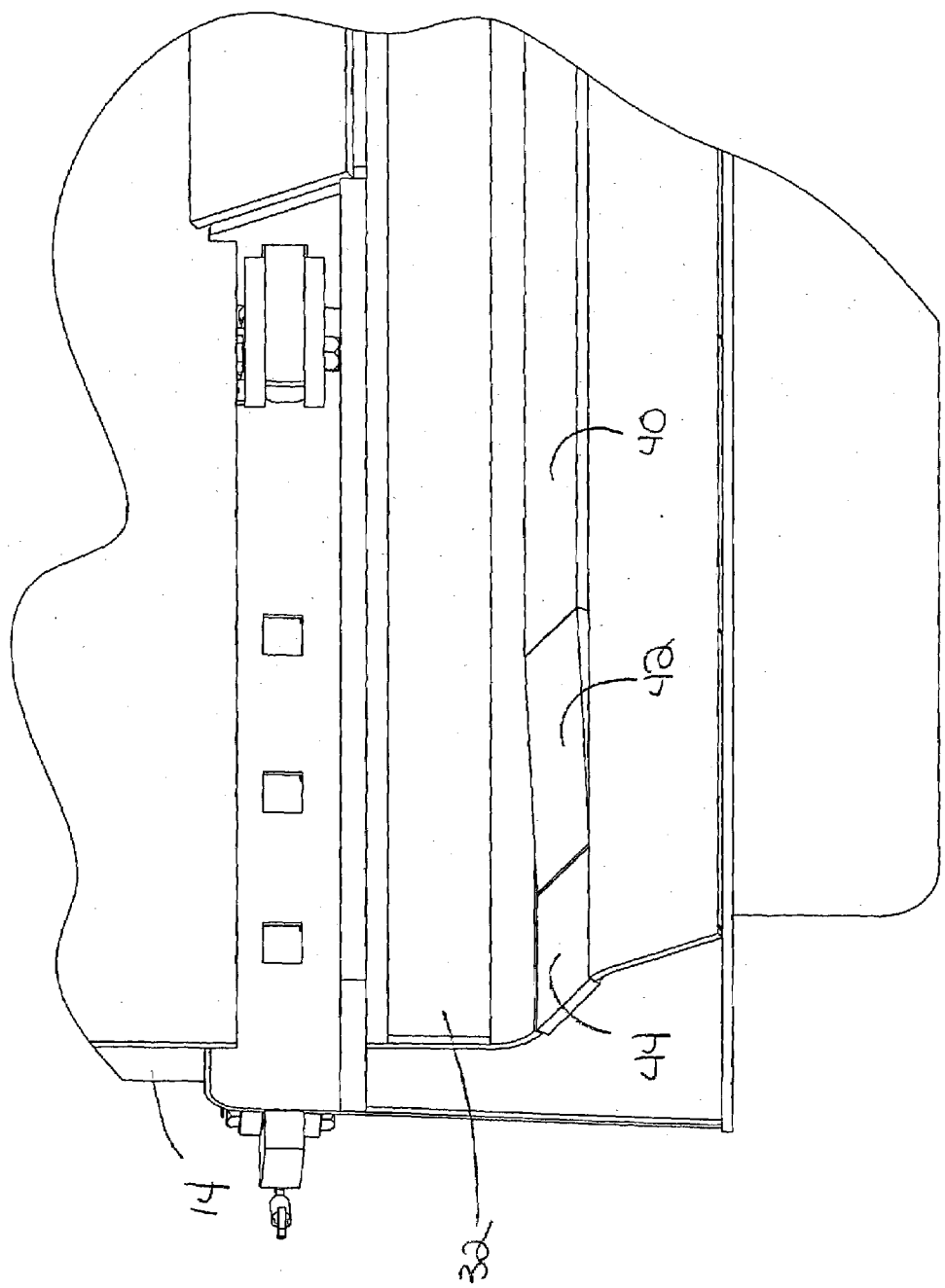
Figure 39:
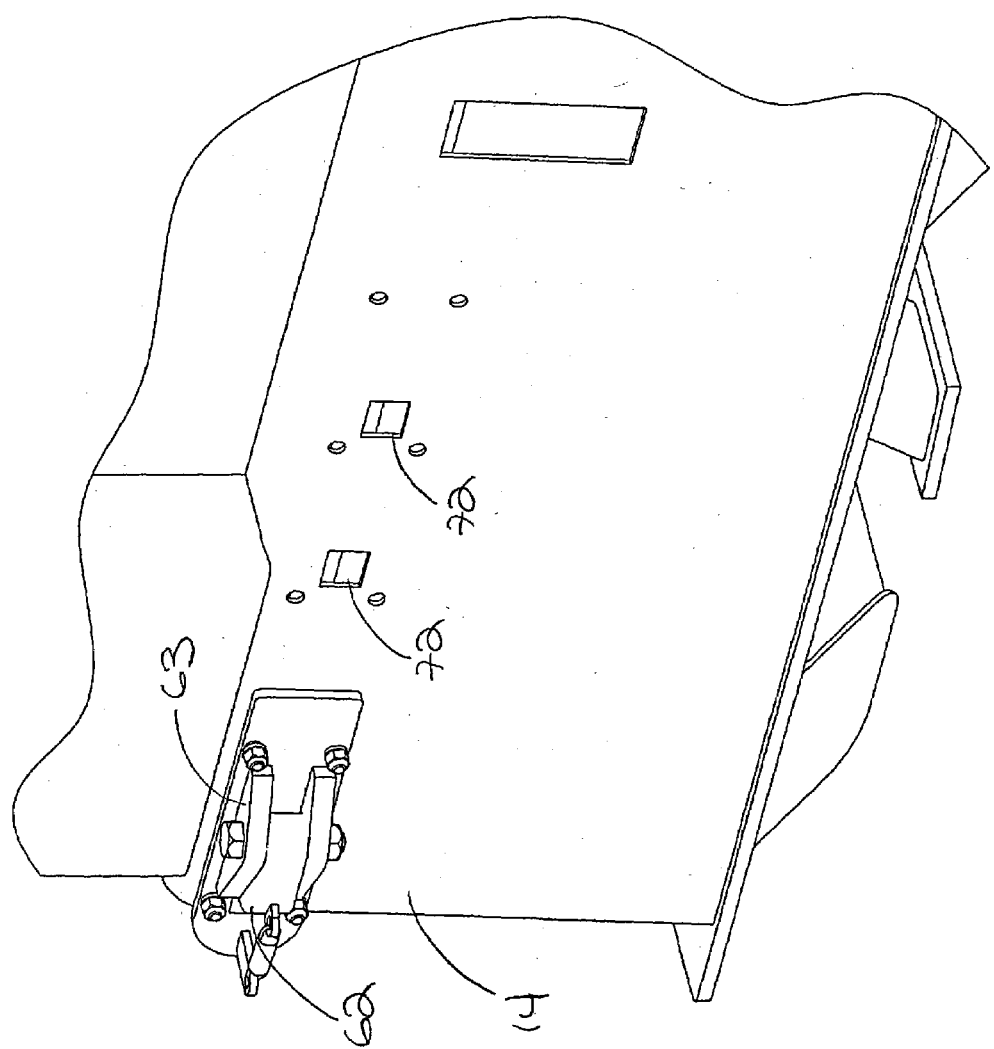
FIG. 39 is an enlarged partial perspective view showing the forward end of one of the body sidewalls and the various mounting positions for the quick release dog of the tailgate actuation system.

As best shown in FIGS. 12, 13 and 39, the rear eject body 12 can be configured so that the quick release dog 62 that allows for "quick" release of the tailgate 16 can be positioned in any one of a plurality of positions. This permits adjustment of the rearward distance the ejector blade 18 moves before the tailgate 16 is released to fully open. In this case, the quick release dog 62 can be positioned in one of four different positions each of which is a different distance from the forward end of the rear eject body 12. Mounting holes for a plate which carries the mounting ears 63 for the quick release dog 62 are provided at each of the mounting positions. A corresponding cutout 72 in the sidewall 14 of the rear eject body 12 is provided for each of the mounting positions (the cutout for the second mounting position from the front is covered by the mounting ears plate in FIG. 39). These cutouts 72 provide the openings through which the quick release dog 62 would operate to release the tailgate 16 at the various release points. Positioning the quick release dog 62 in the mounting ears 63 closest to the forward end of the rear eject body 12 releases the tailgate 16 to the fully open position the quickest, i.e. after the shortest movement of ejector blade 18. In contrast, positioning the quick release dog 62 in the mounting ears 63 furthest from the forward end of the rear eject body 12 releases the tailgate 16 to the fully open position the slowest, i.e. after the greatest movement of the ejector blade 18 and after the tailgate 16 has already pivoted, as a result of the ejector blade movement, a significant distance towards the open position.

Figure 32A:
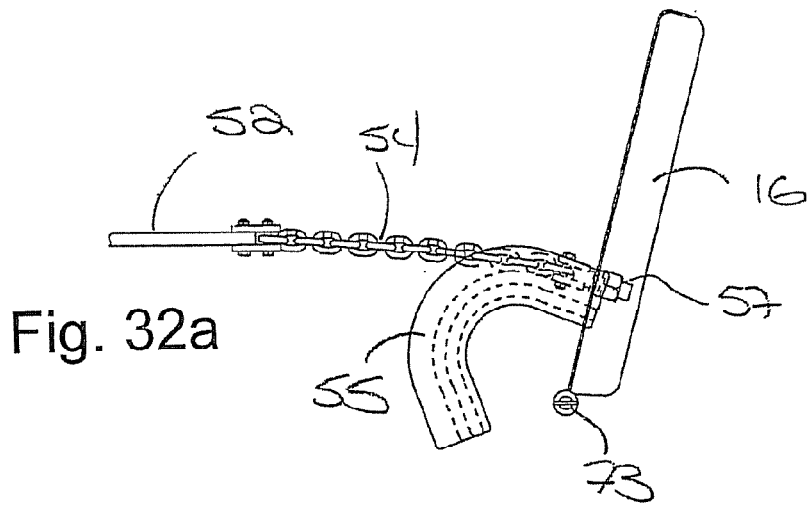
FIGS. 32a-c are partial side views of the tailgate actuation system and tailgate of the rear eject body of FIG. 1 showing the chain and chain drum as the tailgate moves between the closed and open positions.
Figure 32B:
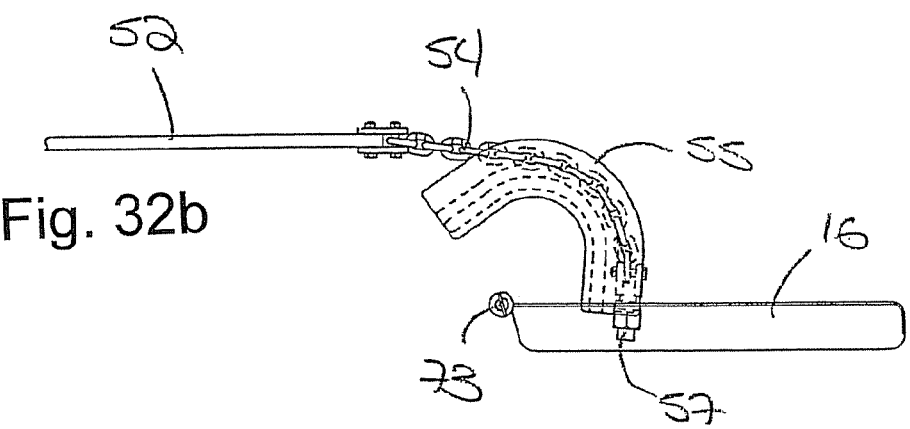
Figure 32C:
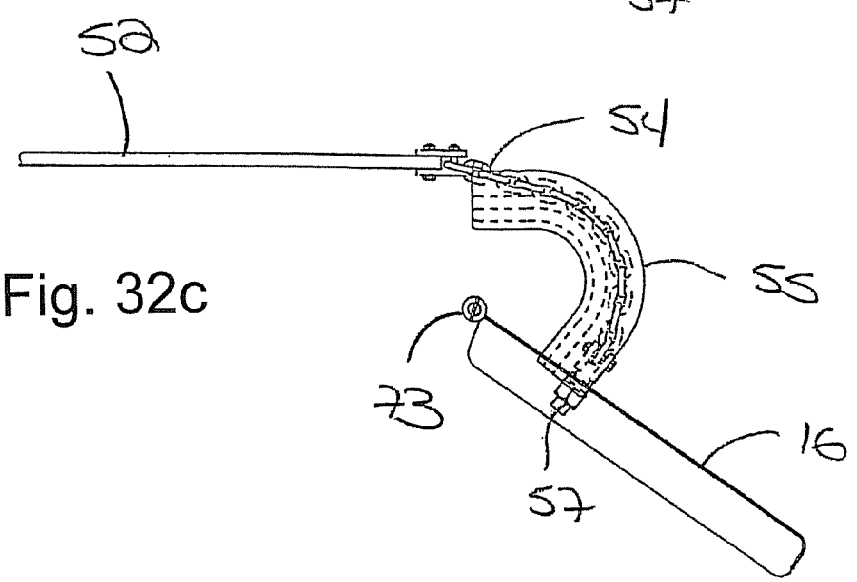

To reduce the force that has to be applied to the ejector blade 18 to rotate the tailgate 16 from the open to the closed position, the tailgate actuation system 50 can be configured so as to vary the torque applied to the tailgate 16 as the tailgate 16 moves between the open and closed position. When closing the tailgate 16, the amount of force required to move and close the tailgate 16 is greatest when the tailgate 16 is in a horizontal position. Once past the horizontal position, the amount of force required to move the tailgate 16 decreases as the tailgate 16 approaches a vertical position over the tailgate pivot point 73. In the embodiment illustrated in FIGS. 29-32 a-c, the varying of the torque is achieved by providing a chain drum 55 having a varying radius such that the moment arm acting on the tailgate 16 from the retraction of the ejector blade 18 varies depending on the tailgate position. The moment arm is the perpendicular distance between the line of action (force) created by the ejector blade acting on release rod 52 and the tailgate pivot point 73. The chain drum 55 provides a curved surface around which the chain 54 acts to apply a moment or torque on the tailgate 16. The chain drum includes a first end that is slidably received in the sidewall 14 of the rear eject body 12 and a second end that is connected to the tailgate 16. In this case, the radius of curvature of the chain drum 55 varies between the first and second ends of the drum such that distance between the chain's line of action and the tailgate pivot point 73 varies depending on the position of the tailgate. Specifically, as best shown in FIG. 32 a-c, the radius of curvature of the chain drum 55 varies such that the radius of actuation or moment arm on which the chain 54 acts to rotate the tailgate 16 is greatest (i.e., the chain's line of action is the furthest distance from the tailgate pivot point 73) when the tailgate 16 is in a horizontal position and the greatest torque is required to rotate the tailgate 16. In turn, the moment arm on which the chain 54 acts is less (i.e., the chain is a relatively shorter distance from the tailgate pivot) when the tailgate 16 is being held in the closed position and when it first starts leaving the fully open position because less torque is required to rotate the tailgate 16 as it is just beginning to leave the fully open position.

Figure 33:
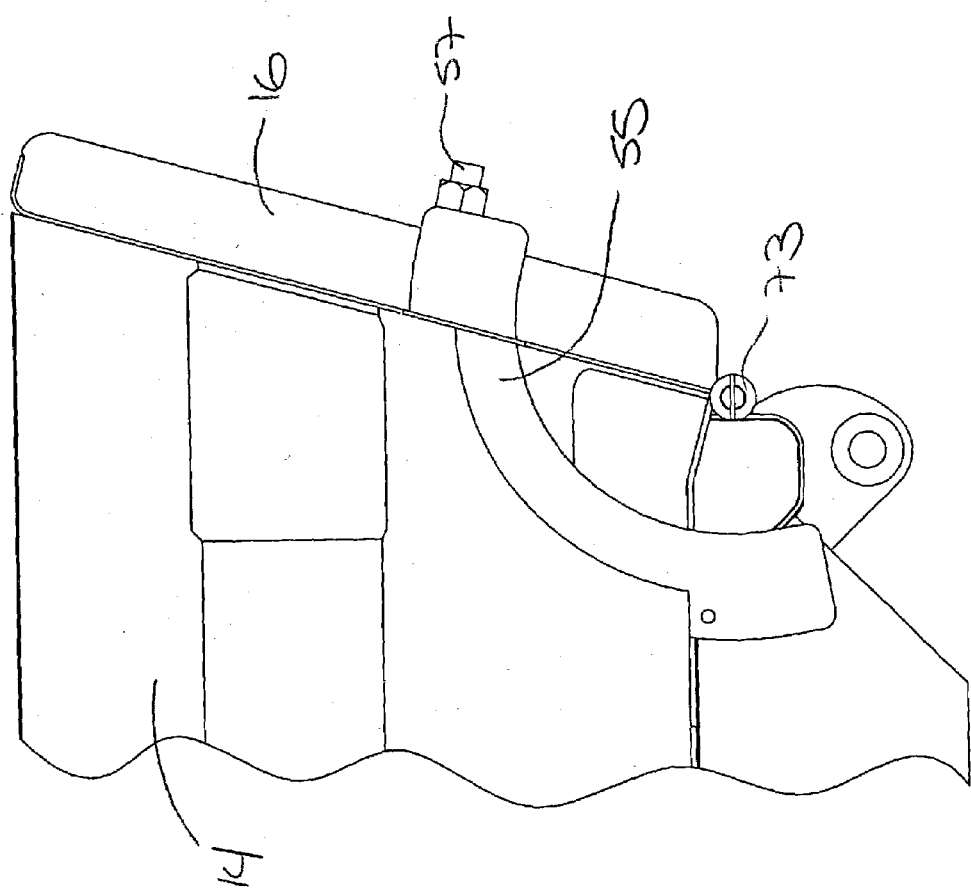
FIG. 33 is an enlarged partial side view of a rear eject body according to the present invention which has an alternative chain drum configuration showing the tailgate in the closed position.
Figure 34:
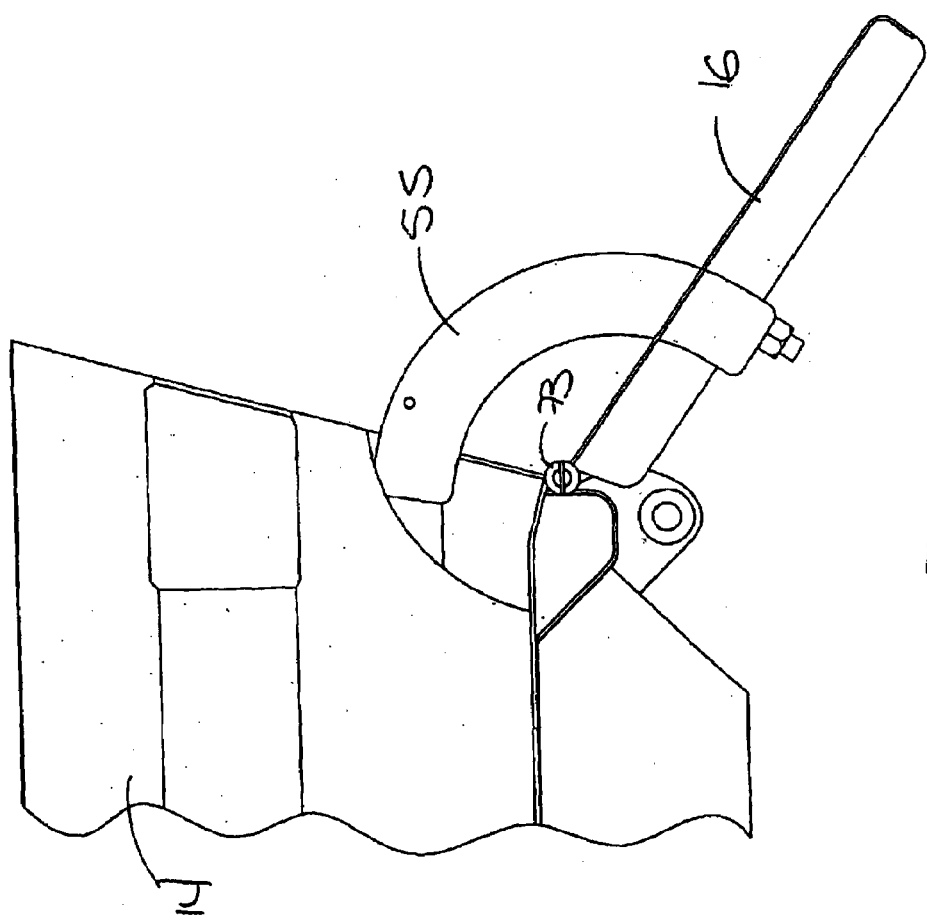
FIG. 34 is an enlarged partial side view of the rear eject body of FIG. 33 showing the tailgate in the nearly open position.

In an alternative embodiment, the chain drum 55 could be arranged and configured such that it has a constant radius of actuation but has a center of rotation that is different than the tailgate pivot point 73 as shown in FIGS. 33 and 34. With this arrangement, the smallest moment arm for the chain 54 is provided when the tailgate 16 is in the fully open position and the greatest moment arm for the chain 54 is provided when the tailgate 16 is nearly fully closed. Accordingly, less force would have to be applied to the chain 54 in order to hold the tailgate 16 in the closed position.

Figure 35:
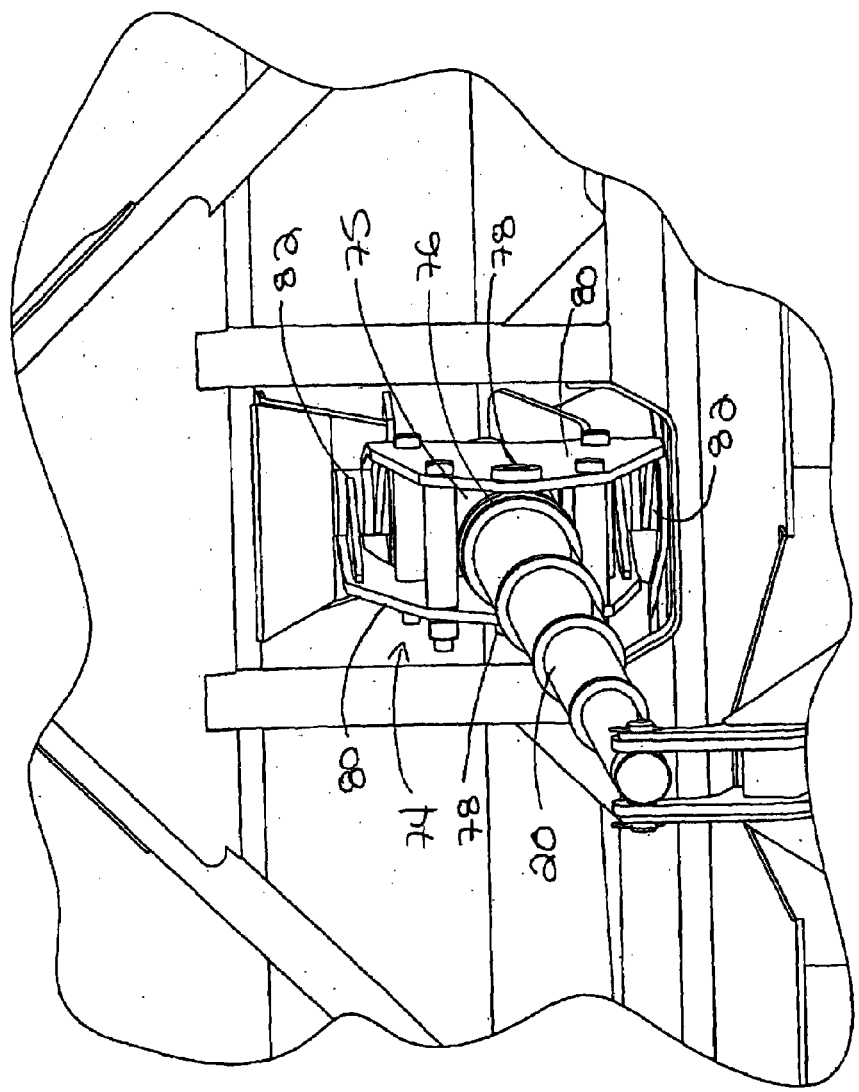
FIG. 35 is an enlarged front perspective view of the rear eject body of FIG. 1 showing the hydraulic cylinder mounting arrangement.
Figure 36:
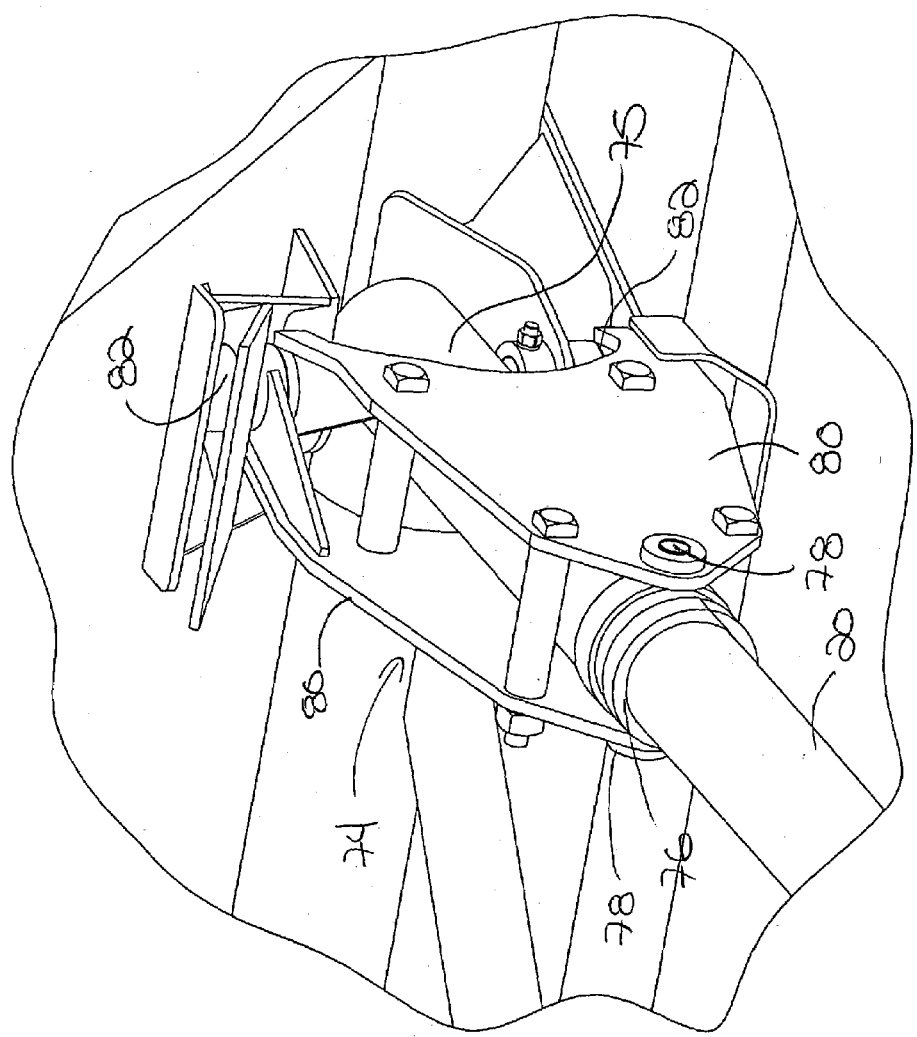
FIG. 36 is an enlarged front perspective view of the rear eject body of FIG. 1 showing the hydraulic cylinder mounting arrangement.

To prevent any twisting movement of the ejector blade 18 from inducing forces into the hydraulic cylinder 20, a hydraulic cylinder mounting arrangement can be provided which permits movement of the ejector blade 18 relative to the hydraulic cylinder 20. In the illustrated embodiment, the hydraulic cylinder mounting arrangement comprises a cylinder trunnion mount 74 as best shown in FIGS. 35 and 36. The cylinder trunnion mount 74 is provided at the forward or rod end of the cylinder barrel 75 of the hydraulic cylinder 20 in order to counterbalance the weight of the cylinder barrel 75 and extended cylinder rod at full hydraulic cylinder extension. The cylinder trunnion mount 74 includes a collar 76 that surrounds the hydraulic cylinder barrel 75. A pair of stub shafts 78 protrude from the collar 76 and are received in a pair of laterally spaced apart plates 80 that are supported on the ejector frame 22. This arrangement allows the hydraulic cylinder 20 to pivot up and down relative to the ejector blade 18. Additionally, the ejector blade 18 may rack or twist slightly side-to-side as it slides back and forth in the rear eject body 12 (e.g., less than an inch on either side of the ejector blade 18). To account for this movement, the cylinder mounting arrangement also has a vertical axis of rotation. In particular, as best shown in FIG. 36, the laterally spaced plates 80 to which the hydraulic cylinder 20 is mounted are connected at their rearward upper and lower ends to a respective pair of vertically extending pivots 82 that are supported on the ejector blade frame 22. These pivots 82 permit the hydraulic cylinder 20 (along with the laterally spaced plates 80) to rotate about a vertical axis defined by the two pivots 82. If the two pivots 82 are arranged so that the vertical axis of rotation is located at or near the neutral point of any side-to-side twisting of the ejector blade 18, side-to-side twisting of the hydraulic cylinder 20 is virtually eliminated. In this case, the vertical axis defined by the two pivots 82 is arranged at the rearward end of the hydraulic cylinder barrel. With this arrangement, the hydraulic cylinder 20 pulls on the ejector blade 18 as it extends or ejects the load in such a way as to produce a centering action on the ejector blade 18.

Figure 40:
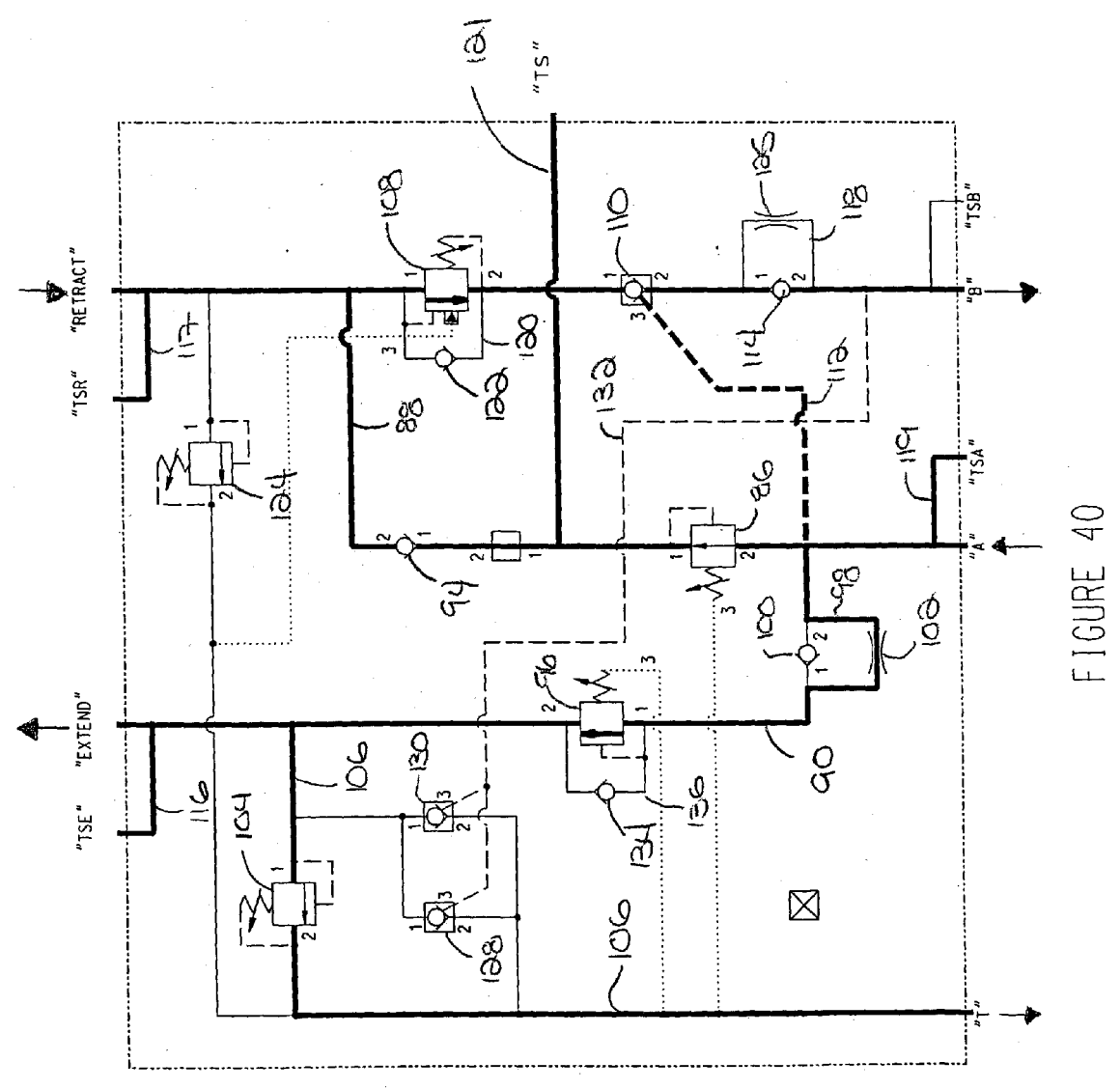
Figure 41:
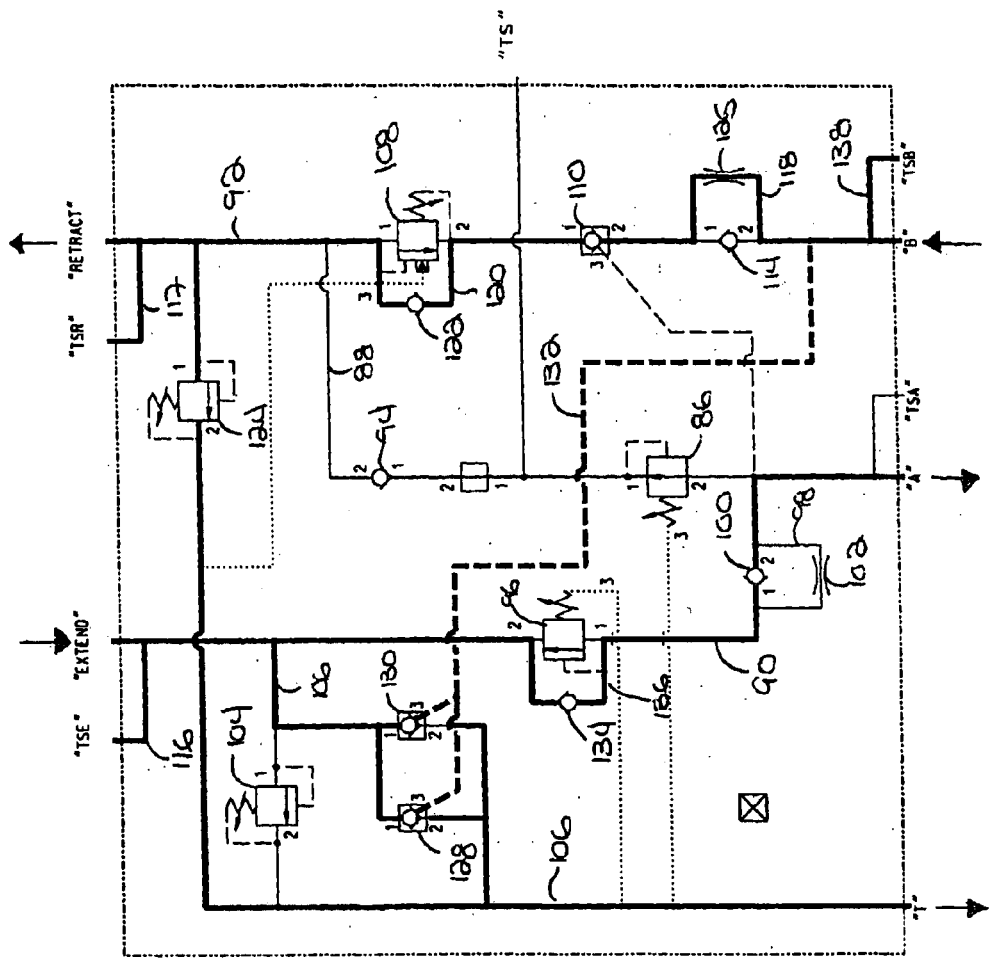
FIG. 41 is a schematic drawing of the hydraulic control system of FIG. 37 with the hydraulic cylinder being retracted. The arrows indicate direction of hydraulic fluid flow into and out of the hydraulic control system.

The illustrated rear eject body 12 can further include a hydraulic control system such as shown in FIGS. 40 and 41. The illustrated hydraulic control system controls extension and retraction of the hydraulic cylinder 20 and, in particular, prevents misfiring of the cylinder. The misfire phenomena in double-acting, multi-stage telescopic cylinders can occur on cylinder extension when one of the smaller diameter stages is partially extended out of sequence, blocking the retract oil flow out of a larger diameter stage back to tank on the retract side of the hydraulic cylinder. It is a phenomenon that is well-known to manufacturers of multi-stage, double-acting telescopic cylinders. By creating a positive backpressure on the hydrauliccylinder 20 retract segments or in the retract pressure line as the hydraulic cylinder 20 is extended, the hydraulic control system 84 of the present invention keeps the multi-stage telescopic sections of the hydraulic cylinder 20 in sequence and prevents misfiring of the cylinder.

The flow of oil to the hydraulic control system can be controlled, for example, by the conventional 3-position, 4-way hydraulic valve that is typically provided on the type of off-highway trucks on which the rear eject body 12 could be installed. The operation of the hydraulic control system during extension and retraction of the hydraulic cylinder 20 is shown in FIGS. 40 and 41 respectively. In FIGS. 40 and 41, the active lines of the hydraulic control system are shown in bold with the valve drain lines being indicated by dotted lines and the active valve pilot pressure lines being indicated by dashed lines. Also, in FIGS. 40 and 41, arrows at each of the active ports indicate hydraulic fluid flow into and out of the hydraulic control system.

Referring now to FIG. 40, during extension of the hydraulic cylinder 20, pressurized hydraulic fluid is first directed into the hydraulic control system 84 through port A. The hydraulic fluid is directed to a pressure reducing valve 86 which is located in a backpressure line that connects the extend and retract lines 90, 92 of the hydraulic control system. The pressure reducing valve 86 reduces the inlet pressure from a standard supply pressure (e.g., about 3000 psi) to a predetermined lower pressure (e.g., about 800 psi). From the pressure reducing valve 86, the hydraulic fluid is directed through a check valve 94 and back pressure line 88 that permits the flow of hydraulic fluid into the retract line 92 (which during cylinder extension is the return to tank line) at the predetermined reduced pressure (e.g., approximately 800 psi).

From port A, hydraulic fluid is also directed to a sequence valve 96 located in the extend line 90 after passing through a bypass line 98 around a check valve 100 that blocks flow from port A. The bypass line 98 includes an orifice 102 which restricts or throttles the rate of hydraulic fluid flow into the extend line 90. In the illustrated embodiment, the hydraulic fluid flow into the extend line 90 is throttled because the trucks on which the rear eject body 12 would typically be mounted produce flow rates into the hydraulic control system 84 that are higher than needed for the hydraulic cylinder 20 to handle. Of course, if the fluid flow rate produced by the truck is in the range that is needed by the hydraulic cylinder 20, the throttling orifice 102 could be eliminated. The sequence valve 96 is configured to block the flow of hydraulic fluid into the extend side of the hydraulic cylinder 20 until the pressure reaches a predetermined value. For example, the sequence valve 96 can be set to open when the pressure reaches approximately 1000 psi. Thus, until the hydraulic fluid from port A reaches a pressure of 1000 psi in the extend line 90, all the hydraulic fluid is diverted through the pressure reducing valve 86 and the backpressure line 88 to produce, in this case, 800 psi of backpressure in the retract side of the hydraulic cylinder 20. This forces the telescopic sections of the retract side of the hydraulic cylinder 20 to be collapsed or retracted in sequence so that as the hydraulic cylinder 20 is extended, the various hydraulic cylinder stages extend in the proper sequence and misfiring is prevented.

Once the pressure in the extend line reaches the predetermined value (e.g., 1000 psi), the sequence valve 96 opens allowing hydraulic fluid to flow directly to the extend side of the hydraulic cylinder 20. This causes the hydraulic cylinder 20 to extend. A pressure relief valve 104 is provided in communication with the extend line 90 that directs hydraulic fluid back to a hydraulic fluid reservoir or tank provided on the truck through tank line 106 when the pressure in the extend line exceeds a predetermined value (e.g., 2200-2300 psi) such as at the end of the hydraulic cylinder stroke.

In the meantime, as the hydraulic cylinder 20 extends, hydraulic fluid is being forced out of the retract side of the hydraulic cylinder 20 into the retract or return line 92. The check valve 94 in the backpressure line 88 prevents that hydraulic fluid from flowing back into the extend line 90 or port A. Instead, the hydraulic fluid forced out of the retract side of the hydraulic cylinder 20 as it extends, is directed to a counterbalance valve 108 in the retract line 92. The counterbalance valve 108 blocks the flow of hydraulic fluid to port B or back to tank until the pressure reaches a predetermined value, for example 1000 psi. Once the hydraulic pressure in the retract line 92 exceeds the predetermined value (e.g., 1000 psi), the counterbalance valve 108 opens and allows hydraulic fluid flow to a pressure operated check valve 110. The pressure operated check valve 110 opens based on a pilot pressure signal from the extend line 90 through pilot line 112. When the pressure operated check valve 110 is opened, the hydraulic fluid can flow to the tank or reservoir through port B. A check valve 114 is arranged in the retract line 92 between port B and the pressure operated check valve 110. However, the check valve 114 is oriented to allow unrestricted hydraulic fluid flow back to port B. In FIG. 40, lines 116, 117, 119 and 121 are test lines for pressure points at which the hydraulic fluid pressure could be tested during extension of the hydraulic cylinder 20.

In sum, when hydraulic fluid is applied to the hydraulic control system in order to extend the hydraulic cylinder 20, pressure first builds in the retract line 92 to 800 psi. When the pressure in line 90 exceeds 1000 psi, the sequence valve 96 opens and allows the hydraulic fluid to flow to the extend side of the hydraulic cylinder 20. The pressure relief valve 104 directs the hydraulic fluid back to the tank if the pressure in the extend line 90 exceeds the predetermined value to which the relief valve 104 is set. The retract line 92 builds to a pressure of 1000 psi and then the counterbalance valve 108 opens and allows hydraulic fluid to flow back through port B to the tank.

Referring now to FIG. 41, when the hydraulic cylinder 20 retracts, hydraulic fluid enters through port B and is directed through the retract line 92 to the check valve 114. This check valve 114 is oriented to block the flow of hydraulic fluid from port B so that the hydraulic fluid is directed through a bypass line 118. The bypass line 118 includes an orifice 125 that restricts the flow of hydraulic fluid into the retract side of the hydraulic cylinder 20. The hydraulic fluid then flows to the pressure-operated check valve 110, which is a one-way check valve oriented to allow unrestricted flow from port B through to the counterbalance valve 108. A bypass line 120 is provided around the counterbalance valve 108. The bypass line 120 includes a check valve 122 that permits unrestricted hydraulic fluid flow from port B to reach the retract side of the hydraulic cylinder 20 (during extension of the hydraulic cylinder, the check valve 122 blocks flow towards port B forcing the hydraulic fluid through the counterbalance valve 108). A pressure relief valve 124 is provided in communication with the retract line 92 which directs the hydraulic fluid back to the tank through the tank line 106 when the pressure in the retract line 92 exceeds a predetermined value (e.g., 2300-2400 psi) such as at the end of the hydraulic cylinder retraction stroke.

Since the piston area found in the extend side of the hydraulic cylinder 20 is substantially greater than the piston area found in the retract side (e.g., approximately seven times greater), when the cylinder is being retracted the hydraulic fluid that is being pushed out of the extend side of the hydraulic cylinder 20 must be allowed to return to the tank in a fairly unrestricted manner. Accordingly, as hydraulic fluid is flowing to the retract side of the hydraulic cylinder 20, a pair of pressure operated check valves 128, 130 in the tank line 106 open based on a pilot pressure signal from the retract line 92 through pilot line 132. The opening of these pressure-operated check valves 128, 130 allows unrestricted flow of oil from the extend side of the hydraulic cylinder 20 to the tank. At the same time, the hydraulic fluid from the extend side can also flow via the extend line back to port A and on to the tank. In particular, the flow in the extend line 90 back to port A proceeds through a check valve 134 in a bypass line 136 around the sequence valve 96 and through the check valve 100 arranged parallel to the bypass line 98 with the flow restricting orifice 102. Both of these check valves 134, 100 are arranged to allow unrestricted hydraulic fluid flow back to port A. In FIG. 41, lines 116, 117 and 138 are test lines for pressure points at which the pressure could be tested during retraction of the hydraulic cylinder 20.

When the hydraulic cylinder is being retracted, the hydraulic fluid flow from the extend side of the hydraulic cylinder 20 back to the tank should be unrestricted in order to prevent backpressure in the extend side of the hydraulic cylinder 20 from stalling retraction of the hydraulic cylinder 20. In particular, because of the much larger piston area on which the extend side pressure acts as compared to the retract side pressure, even a minimal back pressure in the extend side can offset the retract pressure and stall the hydraulic cylinder 20. For example, the ratio of the extend side area to the retract side area can be approximately 8:1. Thus, any backpressure in the extend side of the hydraulic cylinder 20 is multiplied by a factor of 8 when determining the force that is being applied against the retract pressure. In such a case, a pressure of 2400 psi in the retract side can be offset by a backpressure of only 300 psi in the extend side of the hydraulic cylinder 20, effectively stalling retraction of the hydraulic cylinder 20. With the illustrated hydraulic control system, when retracting the hydraulic cylinder 20, the pressure operated check valves 128, 130 allow a free unrestricted flow of oil out of the extend side of the hydraulic cylinder 20 and back to the tank, thereby minimizing the backpressure in the extend side of the cylinder 20.

Figure 42:
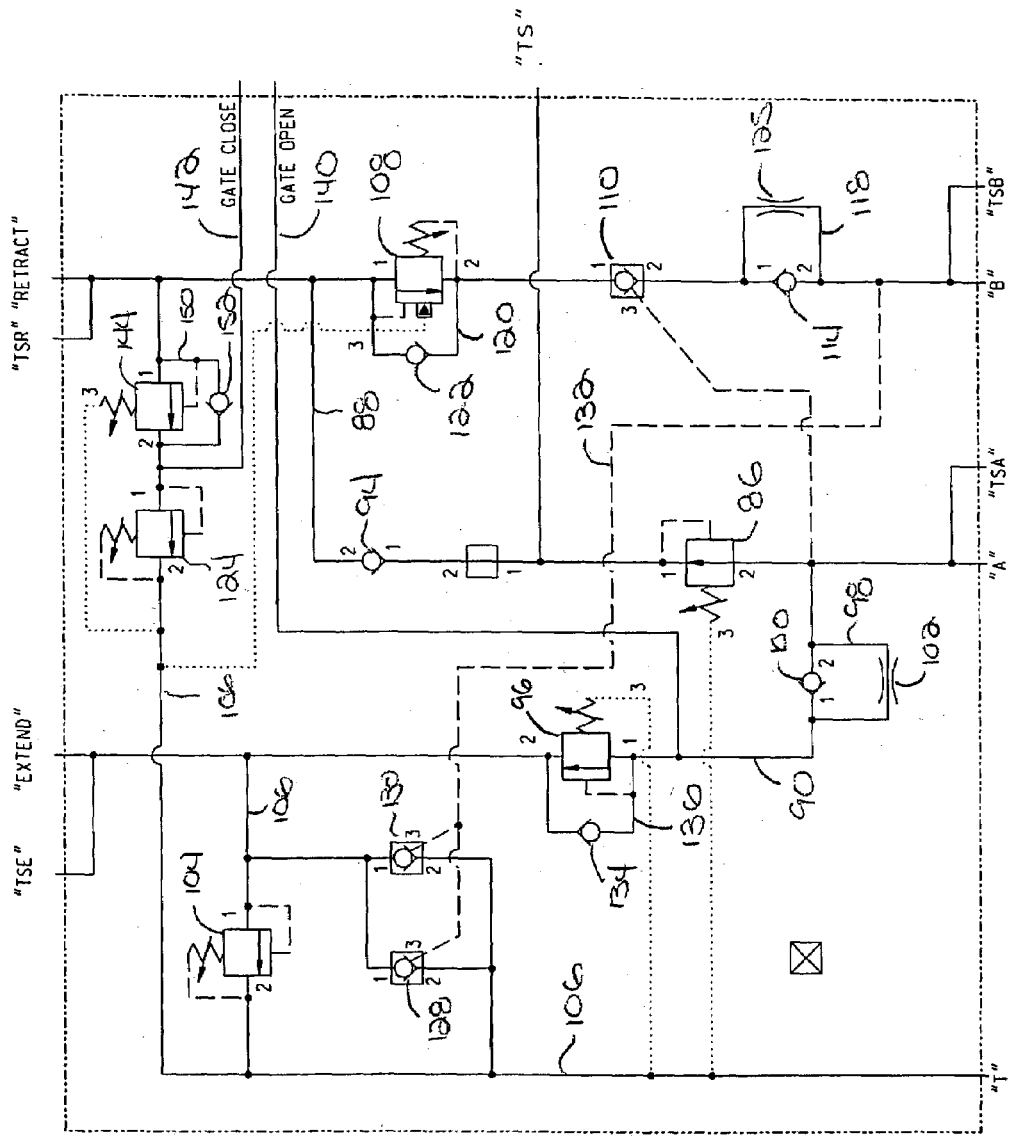
FIG. 42 is a schematic drawing of an alternative hydraulic control system for the hydraulic cylinder that also controls tailgate cylinders which could be used to move the tailgate between the open and closed positions.
Figure 43:
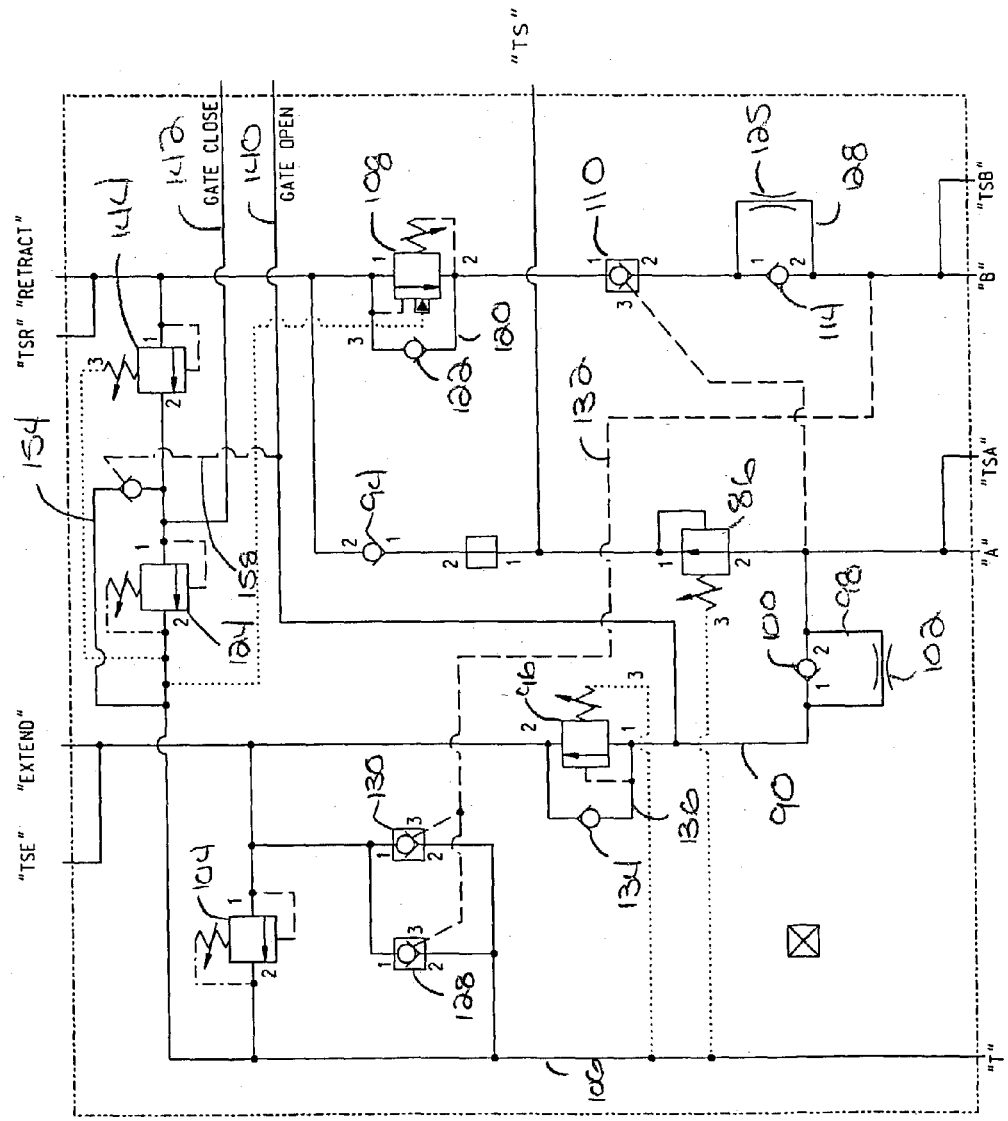
FIG. 43 is a schematic drawing of an alternative hydraulic control system for the hydraulic cylinder which also controls tailgate cylinders which could be used to move the tailgate between the open and closed positions with the addition of a pressure operated check valve in the tailgate close circuit.

Optionally, instead of utilizing the illustrated tailgate actuation system 50, movement of the tailgate 16 between the open and closed positions can be effected by one or more tailgate cylinders. Advantageously, the hydraulic control system 84 can be modified to also control the extension and retraction of these tailgate cylinders as shown in FIGS. 42 and 43. In this case, the tailgate cylinders are arranged such that retraction of the tailgate cylinders opens the tailgate 16. Thus, in order to move the tailgate 16 into the open position when the hydraulic cylinder 20 is extended, the common retract line 140 for the tailgate cylinders is connected to the extend line 90 for the hydraulic cylinder 20.

To ensure that the tailgate 16 opens early in the eject cycle, the retract line 140 for the tailgate cylinders is tied into the extend line 90 of the hydraulic cylinder 20 before the sequence valve 96. Moreover, the sequence valve 96 can be set to a higher pressure setting. For example, the sequence valve could be set to open at 2300 psi as compared to a 1000 psi setting used when the hydraulic control system 84 only controls the hydraulic cylinder 20. Until the sequence valve 96 opens, the flow of hydraulic fluid to the extend side of the hydraulic cylinder 20 is blocked and pressure builds in the retract side of the tailgate cylinder causing the tailgate 16 to open. The hydraulic fluid that is forced out of the extend side of the tailgate cylinders flows through a tailgate cylinder extend line 142 that ties into the tank line 106 upstream of the relief valve 124. Since the hydraulic fluid in the retract side of the hydraulic control system 84 is not at a high enough pressure to open the relief valve 124, the hydraulic fluid from the extend side of the tailgate cylinders travels through a check valve 152 in a bypass line 150 around the sequence valve 144 and builds as backpressure in the retract line 92 of the hydraulic cylinder 20 until the counterbalance valve 108 opens allowing the fluid to return to tank through port B.

Alternatively, as shown in FIG. 43, the hydraulic control system can be configured such that a bypass line 154 is provided around the relief valve 124. The hydraulic fluid from the extend line 142 flows into the bypass line 154 to a pressure operated check valve 156 that opens based on a pressure signal from a pilot line 158 connected to the cylinder retract line 140. When the pressure operated check valve 156 is opened, the hydraulic fluid flows to the tank through line 106.

During retraction of the hydraulic cylinder 20, the sequence valve 144 blocks the flow of hydraulic fluid into the extend side of the tailgate cylinders until the pressure in the hydraulic cylinder retract line 92 reaches a predetermined pressure. In particular, the sequence valve 144 is set to open at pressure lower than the relief valve 124 pressure setting. When the pressure in the hydraulic cylinder retract line 92 reaches the predetermined pressure, the sequence valve 144 opens allowing hydraulic fluid to flow into the extend line 142 of the tailgate cylinder, causing the tailgate 16 to close. The sequence valve 144 thus delays the closing of the tailgate 16 until the ejector blade 18 has started moving towards the retracted position. The hydraulic fluid that is forced out of the retract side of the tailgate cylinders flows through the tailgate cylinder retract line 140 into the hydraulic cylinder extend line 90 and from there back to the tank through port A.

As will be appreciated, the hydraulic control system 84 can be made from an aluminum block that is machined, drilled and tapped accordingly. The specifics regarding the pressure settings of the various valve assembly components are only provided as examples and are not intended to limit the invention in any way.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Of course, variations of those preferred embodiments will become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A rear eject body for a vehicle comprising:
   a container comprising a floor, a pair of opposing sidewalls and an open top for receiving material into the body,
   an ejector blade supported in the rear eject body for movement between a retracted position at a forward end of the container and an extended position at a rear end of the container,
   a tailgate extending between the opposing sidewalls at a rear of the container and pivotally supported by the container for rotation about an axis at or below a lower edge of the floor of the container for rotating the tailgate downwardly, allowing the material in the container to be ejected from the container by the ejector blade's movement from the retracted position to the extended position; and
   a plurality of sleds connected to the ejector blade, each sled connected to the ejector blade for movement independent of movement by the other sleds, and received in one of a pair of guide tracks and each guide track being arranged on an inside surface of a respective one of the sidewalls, wherein the sleds slide in guide tracks and thereby guide the ejector blade as the ejector blade moves between the retracted and extended positions.

2. The rear eject body according to claim 1 wherein each guide track is arranged a distance above the floor of the rear eject body.

3. The rear eject body according to claim 1 wherein each guide track has a bottom wall that angles downward toward the floor of the rear eject body as it extends inward towards the center of the rear eject body.

4. The rear eject body according to claim 1 wherein each guide track includes a bottom wall having a recessed portion adjacent a forward end thereof in which at least one of the sleds rests when the ejector blade is in the retracted position.

5. The rear eject body according to claim 4 wherein the recessed portion comprises a section of the bottom wall of the track which angles downward towards the floor of the rear eject body as the section extends toward the forward end of the track.

6. The rear eject body according to claim 1 wherein the plurality of sleds includes two or more sleds on each of two sides of the ejector blade engaged with one of the pair of guide tracks.

7. The rear eject body according to claim 1 wherein each sled and each guide track is made of or plated with a very hard steel material that can operate against itself without galling.

8. The rear eject body according to claim 7 wherein each sled and each guide track is made of or plated with a wear-resistant high manganese steel alloy.

9. The rear eject body according to claim 7 wherein each sled and each guide track is made of or plated with a material comprising a chromium carbide rich steel alloy on a mild steel backing.

10. The rear eject body according to claim 1 wherein the floor of the rear eject body is made of or plated with a wear-resistant high manganese steel alloy.

11. The rear eject body according to claim 1 wherein the floor of the rear eject body is made of or plated with a material comprising a chromium carbide rich steel alloy on a mild steel backing.

12. A rear eject body for a vehicle comprising:
a container comprising a floor, a pair of opposing sidewalls and an open top for receiving material to be hauled by the vehicle,
a tailgate extending between the opposing sidewalls at a rear end of the container, the tailgate being pivotally supported at a lower of two horizontal edges of the tailgate for movement between opened and closed positions, where the tailgate moves to the open position by rotating downwardly toward a ground surface,
an ejector blade supported in the container for movement between a retracted position at a forward end of the container and an extended position at a rear end of the container,
a hydraulic cylinder for moving the ejector blade between the retracted and extended positions, the cylinder having a barrel and a rod, and
a mounting arrangement for connecting the barrel of the hydraulic cylinder to the ejector blade, the mounting arrangement including a trunnion mount defining a horizontal pivot axis about which the ejector blade and hydraulic cylinder can pivot relative to each other, the horizontal pivot axis being located at a forward end of the barrel adjacent the rod.

13. The rear eject body according to claim 12 further including a plurality of sleds connected to the ejector blade for movement independent of movement by other sleds, each sled being received in one of a pair of guide tracks, wherein the sleds slide in the guide tracks and thereby guide the ejector blade as the ejector blade moves between the retracted and extended positions.

14. A rear eject body for a vehicle comprising:
a container comprising a floor, a pair of opposing sidewalls and an open top for receiving material to be hauled by the vehicle,
a tailgate extending between the opposing sidewalls at a rear end of the container, the tailgate being pivotally supported for rotation about an axis at or below a lower edge of the floor of the container between opened and closed positions, where the tailgate moves to the open position by rotating downwardly toward a ground surface,
an ejector blade supported in the container for movement between a retracted position at a forward end of the container and an extended position at a rear end of the container,
a hydraulic cylinder for moving the ejector blade between the retracted and extended positions, the cylinder having a barrel and a rod, and
a mounting arrangement for connecting the barrel of the hydraulic cylinder to the ejector blade, the mounting arrangement defining a vertical pivot axis about which the ejector blade and hydraulic cylinder can pivot relative to each other, the vertical pivot axis being located at a rearward end of the barrel that is furthest from the rod.

15. The rear eject body according to claim 14 further including a plurality of sleds connected to the ejector blade for movement independent of movement by other sleds, each sled being received in one of a pair of guide tracks wherein the sleds slide in the guide tracks and thereby guide the ejector blade as the ejector blade moves between the retracted and extended positions.

16. A rear eject body for a vehicle comprising:
a container with at least two sides, a floor and an open top for receiving material to be hauled;
an ejector blade moving between retracted and extended positions for pushing the material out of the container;
a tailgate extending between the opposing sidewalls at a rear of the container and pivotally supported by the container for rotation about an axis at or below a lower edge of the floor of the container, allowing the tailgate to rotate downwardly to free the material in the container to be pushed out of the container by the ejector blade's movement from the retracted position to the extended position;
two or more sleds mounted to the ejector blade, each sled having independent movement with respect to the ejector blade and the other sleds; and
each sled mating to a guide track associated with the container for supporting the movement of the ejector blade.

17. The rear eject body of claim 16 wherein the guide track has a top surface extending approximately horizontally away from a side of the container and a bottom surface extending away from the same side at an angle sloping toward the floor such that the top surface extents over the bottom surface and protects the bottom surface from falling debris while the bottom surface supports the weight of the ejector blade transferred from the sleds to the guide tracks as the ejector blade moves between the retracted and extended positions.

18. The rear eject body of claim 16 wherein two or more sleds are mounted for independent movement on each of two sides of the ejector blade and said two or more sleds on each side of the ejector blade engage a guide track associated with the container.

19. The rear eject body of claim 16 wherein the guide track has an inclined surface mating with said each sled such that the inclined surface is a weight bearing surface for the ejector blade.

20. The rear eject body of claim 19 wherein the inclined surface of each of the guide tracks and mating surfaces of the two or more sleds are made of material that does not gall as the ejector blade moves between the retracted and extended positions.

21. The rear eject body of claims 19 wherein the inclined surfaces of the guide tracks are elevated with respect to the floor of the body, which allows debris to fall from the inclined surfaces to the floor and thereby clear the guide tracks as the ejector blade moves.

22. The rear eject body of claim 16 wherein the container has an open front such that the container relies on the ejector blade as a front wall of the container for holding the material.

23. The rear eject body of claim 16 including a tailgate actuation assembly for moving the tailgate between closed and opened positions in response to movement of the ejector blade between the retracted and extended positions, respectively.

24. The rear eject body of claim 23 wherein the tailgate actuation assembly mechanically connects the ejector blade to the tailgate so as to pull the tailgate from the opened position to the closed position after material has been pushed from the container by the ejector blade.

25. The rear eject body of claim 24 wherein the tailgate actuation assembly includes a link wrapped around a drum at one end and connected to the tailgate at another end.

26. The rear eject body of claim 16 wherein each sled and at least a surface of each guide track is made of hardened steel selected from the group of (1) a wear-resistant high manganese steel alloy and (2) a chromium carbide rich steel alloy.

27. The rear eject body of claim 16 wherein the floor of the container is made of or plated with a steel alloy selected from the group of (1) wear-resistant high manganese steel alloy and (2) a chromium carbide rich steel alloy.

28. The rear eject body of claim 16 including a tailgate extending between the two sides of the container at a rear end of the container, the tailgate being pivotally supported for movement between open and closed positions, a tailgate hydraulic cylinder for moving the tailgate between the open and close positions and a common hydraulic control system for controlling flow of hydraulic fluid to and from both the tailgate hydraulic cylinder and a hydraulic cylinder for moving the ejector blade.

29. The rear eject body of claim 16 including a hydraulic cylinder for moving the ejector blade between the retracted and extended positions, the cylinder connected at one end to the ejector blade by one or more pivots that allow the ejector blade to rotate about vertical and horizontal axes of rotation without twisting or bending the cylinder, where the vertical and horizontal axes of rotation are offset from one another and do not intersect.

30. The rear eject body of claim 29 wherein the vertical axis of rotation is located proximate a neutral point of any forces that otherwise would cause side-to-side twisting of the ejector blade.

31. The rear eject body of claim 16 wherein the guide tracks are secured to the sides of the container.

32. The rear eject body of claim 16 wherein the guide tracks are secured to the floor of the container.

33. A rear eject body for a vehicle comprising:
a container with at least two sides, a floor and an open top for receiving material to be hauled; an ejector blade moving between retracted and extended positions for pushing the material out of the body;
a tailgate for moving between open and closed positions, where the tailgate moves to the open position by rotating downwardly toward a ground surface about an axis at or below a lower edge of the floor of the container; and,
a tailgate actuation assembly mechanically connecting the ejector blade and the tailgate so that the tailgate opens and closes in response to movement of the ejector blade.

34. The rear eject body of claim 33 including two or more sleds each mounted to the ejector blade for movement independent of the ejector blade.

35. The rear eject body of claim 33 including two or more sleds each mounted to the ejector blade for movement independent of other sleds.

36. The rear eject body of claim 33 wherein the tailgate actuation assembly connects the tailgate to the ejector blade so as to pull the tailgate from the open to the closed position as the ejector blade retracts.

37. The rear eject body of claim 36 wherein the tailgate actuation assembly includes a link wrapping around a drum at one end and connecting to the tailgate at another end.

38. The rear eject body of claim 33 including a hydraulic cylinder for moving the ejector blade between the retracted and extended positions, the cylinder connected at one end to the ejector blade by one or more pivots that allow the ejector blade to rotate about vertical and horizontal axes of rotation without twisting or bending the cylinder, where the vertical and horizontal axes of rotation are offset from one another and do not intersect.

39. The rear eject body of claim 38 wherein the vertical axis of rotation is located proximate a neutral point of any forces that otherwise would cause side-to-side twisting of the ejector blade.

40. A rear eject body for a vehicle comprising:
a container with at least two sides, a floor and an open top for receiving material to be hauled,
an ejector blade movable between retracted and extended positions for pushing material out of the container,
a hydraulic cylinder for moving the ejector blade between the retracted and extended positions,
the cylinder connected at one end to the ejector blade at a first pivot defining a vertical axis of rotation located proximate a neutral point of any side-to-side twisting of the ejector blade so as to substantially eliminate any side-to-side twisting of the hydraulic cylinder as it moves material out of the body, and
the cylinder connected the one end of the ejector blade to a second pivot defining a horizontal axis of rotation,
where the vertical and horizontal axes of rotation are offset from one another and do not intersect, thereby producing an arrangement that pulls the ejector blade as the cylinder is extended so as to create a centering action on the ejector blade.

41. The rear eject body of claim 40 including a tailgate for moving between open and closed positions and a tailgate actuation assembly for moving the tailgate between the open and closed positions in response to movement of the ejector blade between the extended and retracted positions, respectively, where the tailgate moves to the open position by rotating downwardly toward a ground surface.

42. The rear eject body of claim 40 including two or more sleds mounted to the ejector blade for movement independent of the ejector blade and for mating to one or more guide tracks of the container.

43. The rear eject body of claim 40 including two or more sleds mounted to the ejector blade for independent movement and for mating to one or more guide tracks of the container.

44. A rear eject body for a vehicle comprising:
a container with at least two sides, a floor and an open top for receiving material to be hauled;
an ejector blade moving between retracted and extended positions for moving the material out of the container;
a tailgate extending between the sidewalls at a rear of the container and pivotally supported by the container for rotating downwardly about an axis at or below a lower edge of the floor of the container in order to allow the material in the container to be moved out of the container by the ejector blade's movement from the retracted position to the extended position;
two or more sleds mounted to the ejector blade and mated to a pair of guide tracks secured to the container for supporting the movement of the ejector blade;
each of the guide tracks having a top surface extending approximately horizontally away from a side of the container and a bottom surface extending away from the same side at an angle sloping toward the floor such that the top surface extents over the bottom surface and protects the bottom surface from falling debris while the bottom surface supports the weight of the ejector blade transferred from the sleds to the guide tracks as the ejector blade moves between the retracted and extended positions.

45. The rear eject body of claim 44 wherein the two or more sleds comprises two or more sleds on each side of the ejector blade for mating to one of the pair of guide tracks and each of the sleds on a side of the elector ejector blade are mounted to the ejector blade to move independently of the ejector blade.

46. The rear eject body of claim 44 wherein the two or more sleds comprises two or more sleds on each side of the ejector blade for mating to one of the pair of guide tracks and each of the sleds on a side of the ejector blade are mounted to the ejector blade to move independently of the other sleds.

47. The rear ejector body of claim 45 wherein the sleds are mounted to move so as to allow a sled's position on the ejector blade to be adjustable.

48. The rear ejector body of claim 46 wherein each one of the pair of guide tracks is secured to one of the sides of the container at an elevated position with respect to the floor.

49. The rear eject body of claim 1 wherein each of the guide tracks has a top surface extending approximately horizontally away from a side of the container and a bottom surface extending away from the same side at an angle sloping toward the floor such that the top surface extents over the bottom surface and protects the bottom surface from falling debris while the bottom surface supports the weight of the ejector blade transferred from the sleds to the guide tracks as the ejector blade moves between the retracted and extended positions.

50. The rear eject body of claim 1 wherein the sleds are mounted to move so as to allow a sled's position on the ejector blade to be adjustable.

51. A rear eject body for a vehicle comprising:
a container comprising a floor, a pair of opposing sidewalls and an open top for receiving material into the body,
an ejector blade supported in the rear eject body for movement between a retracted position at a forward end of the container and an extended position at a rear end of the container, and
a tailgate extending between the opposing sidewalls at the rear end of the container and pivotally supported by the container for rotating downwardly about a lower of two horizontal edges of the tailgate in order to allow the material in the container to be ejected from the container by the ejector blade's movement from the retracted position to the extended position;
a plurality of sleds connected to the ejector blade, each sled connected to the ejector blade for movement independent of movement by the ejector blade.

52. The rear eject body of claim 51 wherein the plurality of sleds connected to the ejector blade are connected to the ejector blade for movement independent of movement by the other sleds, and received in one of a pair of guide tracks and each guide track arranged on an inside surface of a respective one of the sidewalls, wherein the sleds slide in guide tracks and thereby guide the ejector blade as the ejector blade moves between the retracted and extended positions.

53. The rear eject body of claim 12 further including a plurality of sleds connected to the ejector blade for movement independent of movement by the ejector blade.

54. The rear eject body of claim 53 wherein the plurality of sleds are connected to the ejector blade for movement independent of movement by the other sleds, each sled being received in one of a pair of guide tracks, wherein the sleds slide in the guide tracks and thereby guide the ejector blade as the ejector blade moves between the retracted and extended positions.

55. A rear eject body for a vehicle comprising:
a container with at least two sides, a floor and an open top for receiving material to be hauled;
an ejector blade moving between retracted and extended positions for pushing the material out of the container;
a tailgate extending between the two sides at a rear end of the container and pivotally supported by the container for rotating downwardly about a lower of two horizontal edges of the tailgate in order to allow the material in the container to be pushed out of the container by the ejector blade's movement from the retracted position to the extended position;
two or more sleds attached to the ejector blade for movement independent of the ejector blade; and
each sled mating to a track associated with the container for guiding movement of the ejector blade.

56. The rear eject body of claim 55 wherein the guide track has a top surface extending approximately horizontally away from a side of the container and a bottom surface extending away from the same side at an angle sloping toward the floor such that the top surface extents over the bottom surface and protects the bottom surface from falling debris while the bottom surface supports the weight of the ejector blade transferred from the sleds to the guide tracks as the ejector blade moves between the retracted and extended positions.

57. The rear eject body of claim 55 wherein two or more sleds are movably mounted on each of two sides of the ejector blade.

58. The rear eject body of claim 55 wherein the track has an inclined surface mating with said each sled such that the inclined surface is a weight bearing surface for the ejector blade.

59. The rear eject body of claim 58 wherein the inclined surfaces of the tracks are elevated with respect to a floor of the body, which allows debris to fall from the inclined surfaces to the floor, thereby clearing the tracks as the ejector blade moves.

60. The rear eject body of claim 55 wherein the container has an open front such that the container relies on the ejector blade as a front wall of the container for holding the material.

61. The rear eject body of claim 55 including a tailgate actuation assembly for moving the tailgate between the closed and opened positions in response to movement of the ejector blade between the retracted and extended positions, respectively.

62. The rear eject body of claim 61 wherein the tailgate actuation assembly is mechanically connected to the tailgate so as to pull the tailgate from the opened position to the closed position after material has been pushed from the container by the ejector blade.

63. The rear eject body of claim 55 including a hydraulic cylinder for moving the ejector blade between the retracted and extended positions, the cylinder connected at one end to the ejector blade by one or more pivots that allow the ejector blade to rotate about vertical and horizontal axes of rotation without twisting or bending the cylinder, where the vertical and horizontal axes of rotation are offset from one another and do not intersect.

64. The rear eject body of claim 63 wherein the vertical axis of rotation is located proximate a neutral point of any forces that otherwise would cause side-to-side twisting of the ejector blade.

65. The rear eject body of claim 55 wherein the tracks are secured to the sides of the container.

66. The rear eject body of claim 55 wherein the tracks are secured to the floor of the container.

67. The rear eject body of claim 14 further including a plurality of sleds connected to the ejector blade for movement independent of movement by the ejector blade.

68. The rear eject body of claim 67 wherein the plurality of sleds are connected to the ejector blade for movement independent of movement by the other sleds, each sled being received in one of a pair of guide tracks, wherein the sleds slide in the guide tracks and thereby guide the ejector blade as the ejector blade moves between the retracted and extended positions.

69. A rear eject body for a vehicle comprising:
 a container with at least two sides, a floor and an open top for receiving material to be hauled;
 an ejector blade moving between retracted and extended positions for moving the material out of the container;
 a tailgate extending between the at least two sides at a rear end of the container and pivotally supported by the container at a lower of two horizontal edges of the tailgate for rotating downwardly in order to allow the material in the container to be moved out of the container by the ejector blade's movement from the retracted position to the extended position;
 two or more sleds attached to the ejector blade and mated to tracks associated with the container for guiding movement of the ejector blade and for supporting at least part of a weigh of the ejector blade; and
 said tracks having inclined surfaces mating with the two or more sleds such that the weight of the ejector blade supported by the tracks is at least in part converted to forces tending to center the ejector blade in the container.

70. The rear eject body of claim 69 wherein the tracks are mounted to the sides of the container and the inclined surfaces slope downwardly from the sides toward the floor of the container.

71. The rear eject body of claim 69 wherein each of the two or more sleds is attached to the ejector blade for movement independent of movement by other sleds.

* * * * *